United States Patent
Coleman-Kammula et al.

(10) Patent No.: US 12,434,222 B2
(45) Date of Patent: Oct. 7, 2025

(54) CROSS-LINKED POLYMERIC AMMONIUM SALTS AND THEIR USE IN ABSORBING ORGANIC CONTAMINANTS

(71) Applicant: STRIDE, New Castle, DE (US)

(72) Inventors: Seetha M. Coleman-Kammula, Newark, DE (US); Garret D. Figuly, Wilmington, DE (US); Charles R. Powley, Wilmington, DE (US); Debora Flanagan Massouda, Wilmington, DE (US)

(73) Assignee: STRIDE, New Castle, DE (US)

( * ) Notice: Subject to any disclaimer, the term of this patent is extended or adjusted under 35 U.S.C. 154(b) by 396 days.

(21) Appl. No.: 18/165,091

(22) Filed: Feb. 6, 2023

(65) Prior Publication Data

US 2023/0182113 A1    Jun. 15, 2023

Related U.S. Application Data

(63) Continuation-in-part of application No. 17/822,317, filed on Aug. 25, 2022, now abandoned, which is a
(Continued)

(51) Int. Cl.
| | | |
|---|---|---|
| *B01J 20/26* | (2006.01) | |
| *B01J 20/20* | (2006.01) | |
| *B01J 20/34* | (2006.01) | |
| *C02F 1/28* | (2023.01) | |
| *C02F 101/36* | (2006.01) | |

(Continued)

(52) U.S. Cl.
CPC ............. *B01J 20/267* (2013.01); *B01J 20/20* (2013.01); *B01J 20/3416* (2013.01); *B01J 20/3425* (2013.01); *B01J 20/3475* (2013.01); *C02F 1/288* (2013.01); *C02F 1/283* (2013.01); *C02F 1/285* (2013.01); *C02F 2101/36* (2013.01); *C02F 2103/007* (2013.01); *C02F 2103/34* (2013.01); *C02F 2103/42* (2013.01); *C02F 2303/16* (2013.01)

(58) Field of Classification Search
None
See application file for complete search history.

(56) References Cited

U.S. PATENT DOCUMENTS

| | | |
|---|---|---|
| 3,882,153 A | 5/1975 | Seki et al. |
| 5,633,344 A | 5/1997 | Figuly |

(Continued)

FOREIGN PATENT DOCUMENTS

| | | |
|---|---|---|
| WO | WO 2007/017864 | 2/2007 |
| WO | WO 2019/186166 | 10/2019 |

(Continued)

OTHER PUBLICATIONS

Senevirathna et al. (Chemosphere, 2010, 80, 647-651). (Year: 2010).*

(Continued)

*Primary Examiner* — Clare M Perrin
(74) *Attorney, Agent, or Firm* — Dunlap Codding, P.C.

(57) ABSTRACT

Use of poly(alkylamine)-derived (PAD) self-supported cross-linked polymeric ammonium salts and ionomer hydrogels for adsorbing and desorbing organic contaminants, specifically per and polyfluoro alkyl substances (PFAS) from water.

20 Claims, 22 Drawing Sheets

Related U.S. Application Data continuation of application No. 17/480,579, filed on Sep. 21, 2021, now abandoned.

(60) Provisional application No. 63/081,129, filed on Sep. 21, 2020.

(51) Int. Cl.
    C02F 103/00 (2006.01)
    C02F 103/34 (2006.01)
    C02F 103/42 (2006.01)

(56) References Cited

U.S. PATENT DOCUMENTS

| | | |
|---|---|---|
| 9,815,712 B2 | 11/2017 | Diallo et al. |
| 10,744,497 B2 | 8/2020 | Zipplies et al. |
| 2015/0053620 A1 | 2/2015 | Suri et al. |
| 2017/0297926 A1 | 10/2017 | Nickelsen et al. |
| 2019/0185352 A1 | 6/2019 | Chiang |
| 2019/0263679 A1 | 8/2019 | Phillips et al. |
| 2019/0300387 A1 | 10/2019 | Nelson |
| 2020/0206793 A1 | 7/2020 | Brady |
| 2020/0262936 A1 | 8/2020 | Barin et al. |
| 2020/0283309 A1 | 9/2020 | Reid et al. |
| 2020/0306726 A1 | 10/2020 | James et al. |
| 2021/0008522 A1* | 1/2021 | Reeve .............. C07C 53/21 |
| 2022/0017645 A1* | 1/2022 | Barin .............. C08G 18/305 |
| 2024/0109989 A1* | 4/2024 | Leibfarth .......... C08F 214/287 |

FOREIGN PATENT DOCUMENTS

| WO | WO 2020/113004 | 6/2020 |
|---|---|---|
| WO | WO 2020167375 | 8/2020 |

OTHER PUBLICATIONS

McCleaf et al. (Water Research, 2017, 120, 77-87). (Year: 2017).*
Yu et al. (Water Research, 2009, 43, 1150-1158). (Year: 2009).*
Liu et al. (Environmental Science & Technology, 2015, 49, 8657-8665). (Year: 2015).*
Ray et al. (Water Research, 2019, 157, 454-462). (Year: 2019).*
Sun et al. (Journal of Water Process Engineering, 2020, 37, 101416). (Year: 2020).*
Xie et al. (Journal of Hazardous Materials, 2022, 431, 128521). (Year: 2022).*
Ateia, M., Attia, M. F., Maroli, A., Tharayil, N., Alexis, F., Whitehead, D. C., & Karanfil, T. (2018). Rapid Removal of Poly- and Perfluorinated Alkyl Substances by Poly(ethylenimine)—Functionalized Cellulose Microcrystals at Environmentally Relevant Conditions. Environmental Science and Technology Letters, 5, 764-769.
Chularueangaksorn, P., Tanaka, S., Fujii, S., & Kunacheva, C. (2014). Adsorption of perfluorooctanoic acid (PFOA) onto anion exchange resin, non-ion exchange resin, and granular-activated carbon by batch and column. Desalination and Water Treatment, 52, 6542-6548.
Stebel, E. K., Pike, K. A., Nguyen, H., Hartmann, H. A., Klonowski, M. J., Lawrence, M. G., . . . Edmiston, P. L. (2019). Adsorption of short-chain to long-chain perfluoroalkyl substances using swellable organically modified silica. Environmental Science: Water Research Technology, 5, 1854-1866.
Xiao, L., Ling, Y., Alsbaiee, A., Li, C., Helbling, D. E., & Dichtel, W. R. (2017). β Cyclodextrin Polymer Network Sequesters Perfluorooctanoic Acid at Environmentally Relevant Concentrations. Journal of the American Chemical Society, 139, 7689-7692.
Yan, B., Wang, J., & Liu, J. (2021). STXM-XANES and computational investigations of adsorption of per- and polyfluoroalkyl substances on modified clay. Water Research, 201, 1-10.
Zhang, D., Luo, Q., Gao, B., Chiang, D., Woodward, D., & Huang, Q. (2016). Sorption of Perfluorooctanoic Acid, Perfluorooctane Sulfonate and Perfluoroheptanoic Acid 2 on Granular Activated Carbon. Chemosphere, 144, 2336-2342.
Author: Genuis et al.; Title: Human Detoxification of Perfluorinated Compounds ;Jun. 19, 2010, Publisher: Public Health, 124 (2010) 367-375 (11 pages). (Year: 2010).
Author: Johnson et al.; Title: Cholestyramine-Enhanced Fecal Elimination of Carbon-14 in Rats after Administration of Ammonium [14C]Perfluorooctanoate or Potassium [14C)Perfluorooctanesulfonate; 1984, Publisher: Fundamental and Applied Toxicology 4, 972-976 (1984) (5 pages). (Year: 1984).
Author: Gobelius et al.; Title: Calibration and application of passive sampling for per- and polyfluoroalkyl substances in a drinking water treatment plant;2019, Publisher: Journal of Hazardous Materials 362 (2019) 230-23 (8 pages). (Year: 2019).
Author: Mitsubishi Chemical Corporation; Title: Product Data Sheet DIAION WA20; 2021; (2 pages). (Year: 2021).
Author: Pyvot; Title: Polyamine Type DIAION WA20, WA21J; 2021; (2 pages). https://pyvot.tech/product/ polyamine-type-diaion-wa20-wa21j/. (Year: 2021).
United States Patent and Trademark Office; DIAION WA 20 trademark; 1 page. (Year: 1982).
Wayback machine for Author: Pyvot; Title: Polyamine Type DIAION WA20, WA21J; 2021; (1 page). https://pyvot.tech/product/ polyamine-type-di aion-wa20-wa21j/. (Year: 2021).
International Search Report and Written Opinion dated Jan. 18, 2022; 9 pgs.
Mohamed Ateia, MD Arifuzzaman, Steven Pellizzeri, Mohamed F. Attia, Nishanth Tharayil, Jeffrey N. Anker, Tanju Karanfil (2019) Water Research 163 (2019) 114874, 8 pages, www.elsevier.com/locate/watres.
Extended European Search Report dated Aug. 30, 2024; (6 pgs).

* cited by examiner

Results of Testing PFOA Sorption Using a Column Packed with
HG-1 and HG-5 Mixed with GAC at 1:9 Ratio

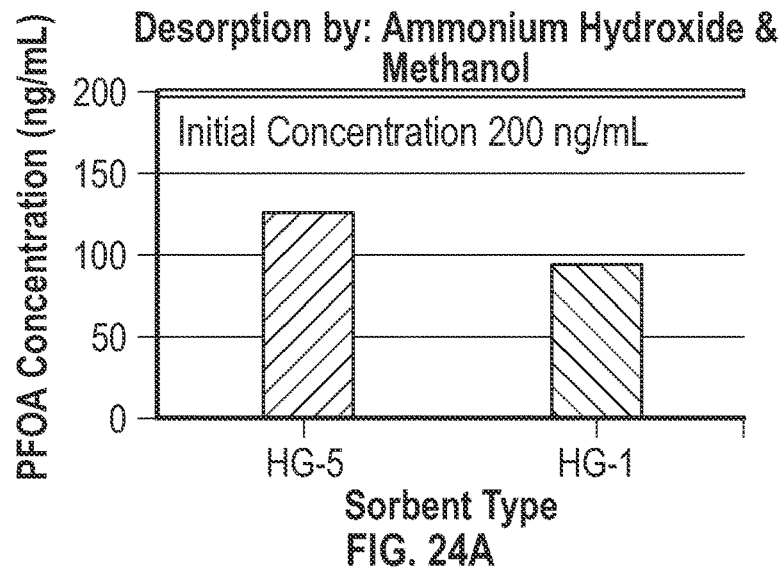
FIG. 24A
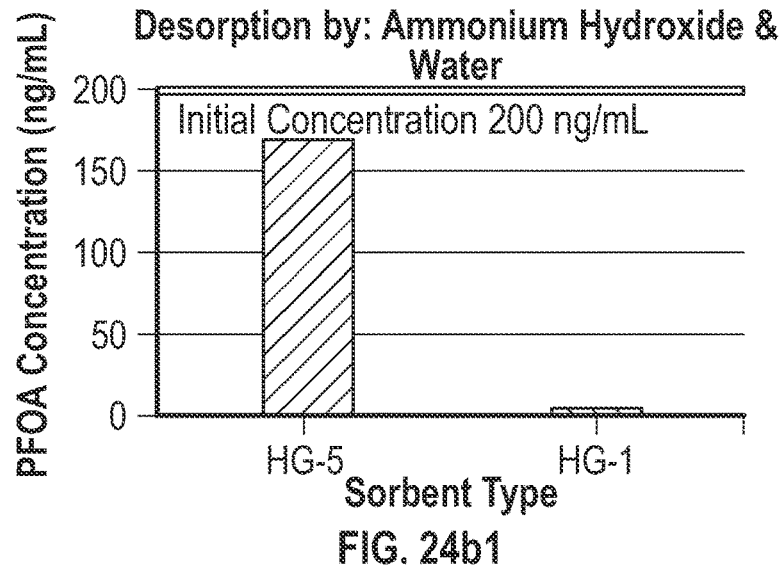
FIG. 24b1
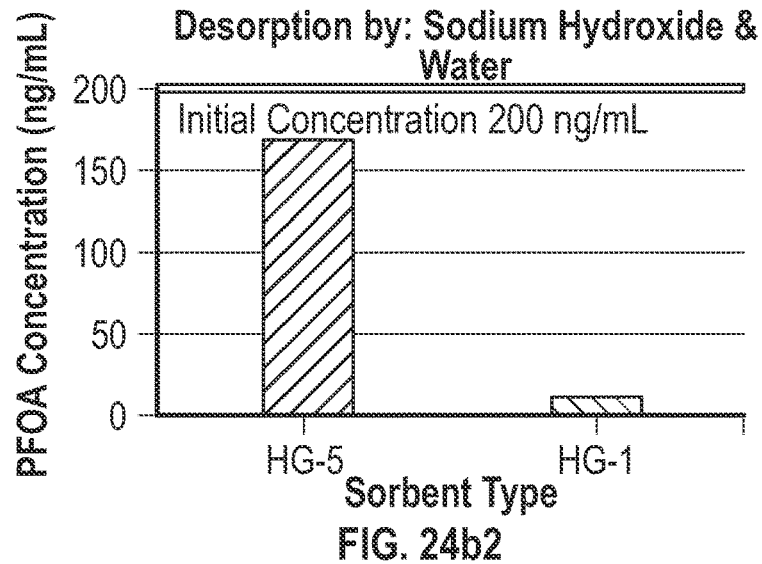
FIG. 24b2

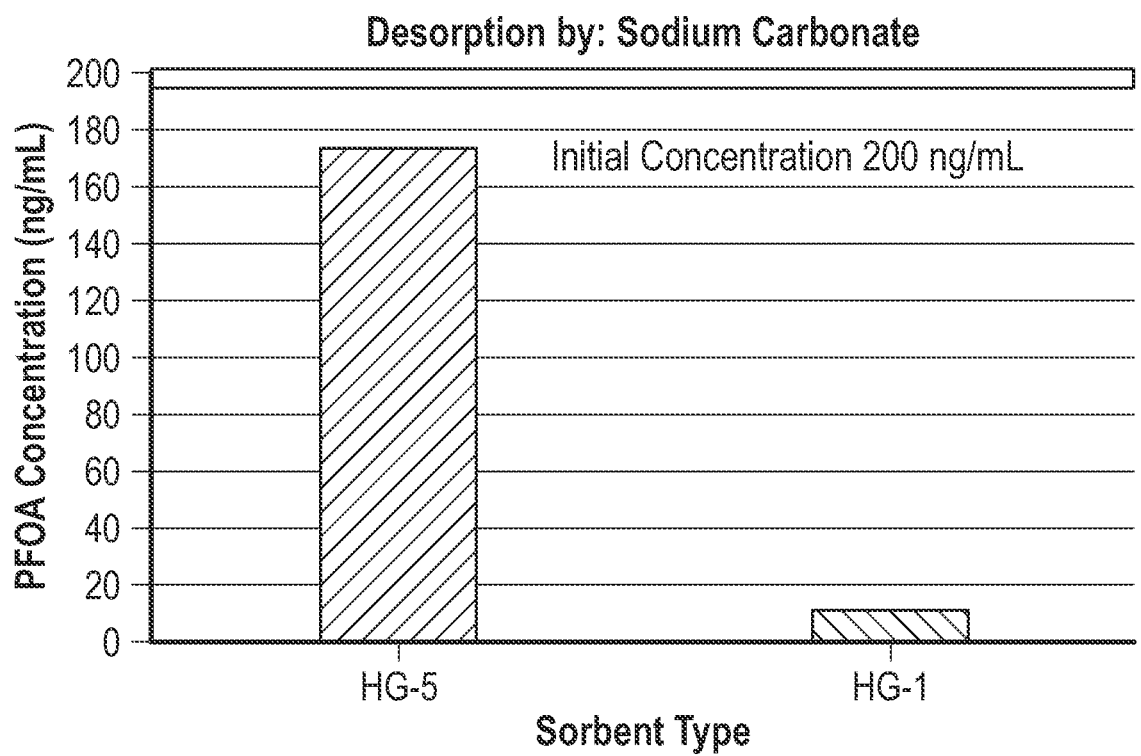
FIG. 24b3
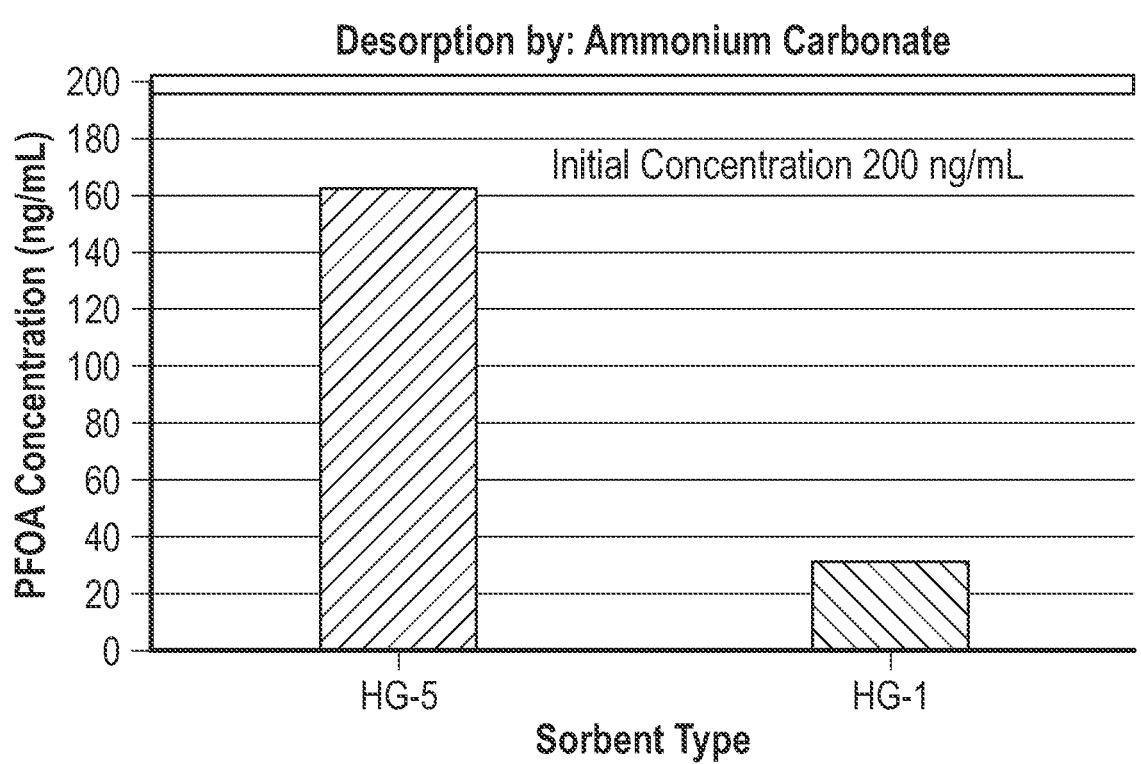
FIG. 24b4

CROSS-LINKED POLYMERIC AMMONIUM SALTS AND THEIR USE IN ABSORBING ORGANIC CONTAMINANTS

CROSS-REFERENCE TO RELATED APPLICATIONS

This application is a continuation-in-part of U.S. Ser. No. 17/822,317, filed on Aug. 25, 2022; which is a continuation of U.S. Ser. No. 17/480,579, filed on Sep. 21, 2021, which claims benefit to U.S. Provisional Application No. 63/081,129, filed on Sep. 21, 2020; the entire contents of each being hereby expressly incorporated herein by reference.

BACKGROUND OF THE INVENTION

The described and claimed inventive concept(s) relate to the use of certain self-supported cross-linked polymeric ammonium salts for absorbing and desorbing organic contaminants, and, more particularly, to the use of such self-supported cross-linked polymeric ammonium salts for absorbing at least one Per and Polyfluoro Alkyl Substance (PFAS) from water, and thereafter desorbing the at least one Per and Polyfluoro Alkyl Substance (PFAS) from water by changing the pH.

Per- and Polyfluoroalkyl substances (PFAS) have been shown to be highly persistent in the environment and in biological tissue and have been correlated with negative health impacts. According to the Agency for Toxic Substances and Disease Registry (ATSDR), PFAS increase cholesterol and suppress the immune system. PFAS can bio-accumulate, some having very long half-lives in humans, and they are found in the blood of a large percentage of the U.S. population. They are very stable chemicals that can persist in soil and water for long periods of time, and they are highly mobile in soils and water.

PFAS encompass a family of manmade chemicals used in consumer and industrial applications, such as, for example, in the fabrication of non-stick cookware, grease-resistant paper, fast food wrappers, microwave popcorn bags, stain-resistant carpets and fabrics, water-resistant clothing and in cleaning and personal care product formulations and in aqueous film-forming foams (AFFF) for fire suppression. There are more than 3,000 PFAS chemicals that are in current use, or have previously been used, on the global market. While the origin of the environmental contamination is not known in most cases, current focus seems to be on Aqueous Film-Forming Foams (AFFF's) as 75% of the contaminated sites reported to date have some association with AFFF's. While current regulations are focusing on restricting only two of the longer chain PFAS compounds (PFOA and PFOS), several states are expanding the list to include shorter chain PFAS as toxicity data become available for those compounds.

Available conventional water treatment systems and methods to remove PFAS from water have shortcomings. Granular activated carbon (GAC) adsorption systems and methods used to remove PFAS from water, for example, have been shown to be somewhat effective on longer-chain PFAS, but are less effective in removing branched and shorter chain compounds.

U.S. Pat. No. 3,882,153 (Seki et al.) describes a method for recovering fluorinated carboxylic acid by passing its diluted solution in absorptive contact with a weak basic anion-exchange resin. All such anion exchange materials are composed of a macro-porous polymer, gel-like polymer, or other solid support material that has been treated with additives that feature amines as the active group for anion exchange. Similar to activated carbon, some conventional anion exchange resins (IX) may be more effective at removing longer chain PFAS than the shorter chain compounds. Other anion exchange resins have shown some success in removing a broader range of PFAS, including shorter-chain compounds. However, removal of the PFAS to recover the ion exchange resins for re-use can be difficult, and resins that are more readily regenerated are less effective for broad range PFAS adsorption. In addition, these sorbents have some deficiencies when used to remediate well and river waters. For example, PFAS concentrations in these waters are usually orders-of-magnitude lower than background constituents (ppt being low vs. ppb being high), such as natural organic matter (NOM) and metal ions, which compete with PFAS for sorption sites with the result that PFAS removal is reduced.

U.S. Patent Publication No. 2021/0008522 A1 (Reeve et al.) describes modified polyamines that have been grafted to a particulate, solid support as a sorbent material for removing PFAS compounds from fluids. Solid, and sometimes bulky, support materials, however, have been shown to limit the ultimate capacity of the polyamine for adsorbing PFAS. Without a solid support, amines and polyamines described in the prior art, being liquids and water soluble, would not by themself be useful adsorbents. Support materials of the type known from Reeve et al. and, for example, from U.S. Patent Publication No. 2020/0262936 A1 (Barin et al.) do not contribute to PFAS adsorption and can, in fact, hinder PFAS adsorption. Such support materials also require multiple additional chemical steps to produce. Though materials containing amine functional groups have been shown to absorb PFAS, in these types of materials, amine functionality and porosity of the sorbents play a key role on PFAS removal efficiency, kinetics, and capacity. In addition, a strategy of incorporating swell and de-swell properties into the PFAS adsorbent material has never been reported with self-supported amine functionalized PFAS sorbents.

U.S. Pat. No. 5,633,344 (Figuly) describes a class of pharmaceutically acceptable crosslinked polymeric ammonium salts that are useful as bile acid sequestrants and charge transfer agents. The bile acid sequestrant polymers can be administered as cholesterol lowering agents by any means that produces contact of the active agent with bile acids in the gut of a mammal. Representative bile acid sequestrant polymers of the type described demonstrate a plasma cholesterol lowering effect in animals.

There remains a critical need, therefore, to develop PFAS sorbents that exhibit rapid and efficient removal of PFAS compounds of all chain lengths and facile regeneration through de-sorption wherein three design elements are incorporated: (i) self-supported water insoluble polyamine sorbents; (ii) provision of a molecular environment in the polyamines that balances lipophilic and hydrophilic forces to attract amphiphilic PFAS molecules; (iii) exhibition of an ability to tune the chain length of lipophilic blocks to match the chain length of the PFAS molecules to be adsorbed; and (iv) exhibition of an ability to vary cross-link density thereby affecting properties such as water solubility and swell levels.

SUMMARY OF THE INVENTION

The inventive concept(s) described and claimed herein relate to a method for absorbing at least one PFAS molecule from an aqueous medium wherein said at least one PFAS molecule comprises a water soluble fluorinated amphiphilic structure with a carbon chain length that ranges from 4 to at least 14 carbon atoms which comprises:

contacting said PFAS molecule with at least one self-supported crosslinked polymeric ammonium salt, wherein said salt is a water-insoluble, solid polyelectrolyte having at least one polymer chain, wherein said polyelectrolyte comprises a copolymer network wherein ammonium nitrogen atoms are separated by group Y or group Z ordered along (i) polymer chains as N—Z—[N—Y—N—Z]$_n$—N and along (ii) cross-linking polymer chains as Y, or Y—N—Z—N—[Y—N—Z—N]$_n$—Y, wherein said cross linking polymer chains connect between one ammonium nitrogen atom in one polymer chain, and another ammonium nitrogen atom in another polymer chain and (iii) along pendant polymer chains as Y—N—Z—[N—Y—N—Z]$_n$—N wherein said pendant chains originate at ammonium nitrogen atoms in other polymer chains, wherein n has a value from 0 to any higher integer, wherein group Y is an n-alkylene group or an alkyl substituted n-alkylene group, wherein said n-alkylene group or said alkyl substituted n-alkylene group has from 2 to at least 20 carbon atoms; and group Z is a hydrocarbylene radical containing from 2 to 50 carbon atoms, said hydrocarbylene radical optionally substituted with one or more hydroxyl, ether, amino, thioether, keto, ester, silyl group or heterocyclic rings; and at least 25% of the ammonium nitrogen atoms are secondary ammonium nitrogen atoms, with the result that said PFAS molecules are absorbed into said at least one crosslinked polymeric ammonium salt.

According to one embodiment, said at least one PFAS molecule is contacted with a mixture of said crosslinked polymeric ammonium salts.

According to an alternate embodiment, best results are believed to occur when the hydrocarbylene groups contain from 1 to 30 carbon atoms.

According to another embodiment, the crosslinked polymeric ammonium salts contemplated for use herein have a swell factor of at least about 2 in water.

According to another embodiment, the crosslinked polymeric ammonium salt is a poly(alkylamine) ammonium salt.

According to another embodiment, the poly(alkylamine) ammonium salt is prepared from hexamethylene diamine and 1,10-dibromodecane using DMF/methanol as solvent.

According to another embodiment, the poly(alkylamine) ammonium salt is prepared from polyethylene imine, replacing the diamine and an alkyl dibromide, using DMF/methanol as solvent.

According to yet another embodiment, the described and claimed inventive concept(s) includes the additional steps of (i) desorbing the PFAS molecules from the at least one crosslinked polymeric ammonium salt, or from the mixture of crosslinked polymeric ammonium salts, by contacting the at least one crosslinked polymeric ammonium salt which contains PFAS molecules with an aqueous alkaline solution having a pH in the range of from about 8 to 14 with the result that the PFAS molecules are released from the at least one crosslinked polymeric ammonium salt, or from the mixture of crosslinked polymeric ammonium salts, and (ii) recovering the PFAS molecules and the at least one crosslinked polymeric ammonium salt or the mixture of crosslinked polymeric ammonium salts.

According to another embodiment, the alkaline solution is prepared from ammonium hydroxide and methanol.

According to another embodiment, the aqueous alkaline solution is prepared from sodium hydroxide and water.

According to another embodiment, the aqueous alkaline solution is prepared from ammonium hydroxide and water.

According to another embodiment, the PFAS molecules comprise telomer alcohols of the type used in aqueous fire-fighting foam compositions.

According to another embodiment, the described and claimed crosslinked polymeric ammonium salts are deployed in polar organic chemical integrative samplers (POCIS).

According to another embodiment, the described and claimed crosslinked polymeric ammonium salts are deployed with a flocculent or a coagulant to provide for PFAS removal from aqueous media together with suspended solids.

The aqueous media contemplated for application of the described and claimed inventive concept(s) comprise at least one of stagnant pools, wells, rivers, springs, estuarine systems, and industrial and municipal wastewater streams.

BRIEF DESCRIPTION OF THE DRAWINGS

FIGS. 24A, 24b1, 24b2, 24b3 and 24b4 show results from the desorption step in Example 18 for HG-1 and HG-5, using ammonium hydroxide and methanol; ammonium hydroxide and water; sodium hydroxide and water; sodium carbonate; and ammonium carbonate.

DETAILED DESCRIPTION OF THE INVENTIVE CONCEPT(S)

Figure 1:
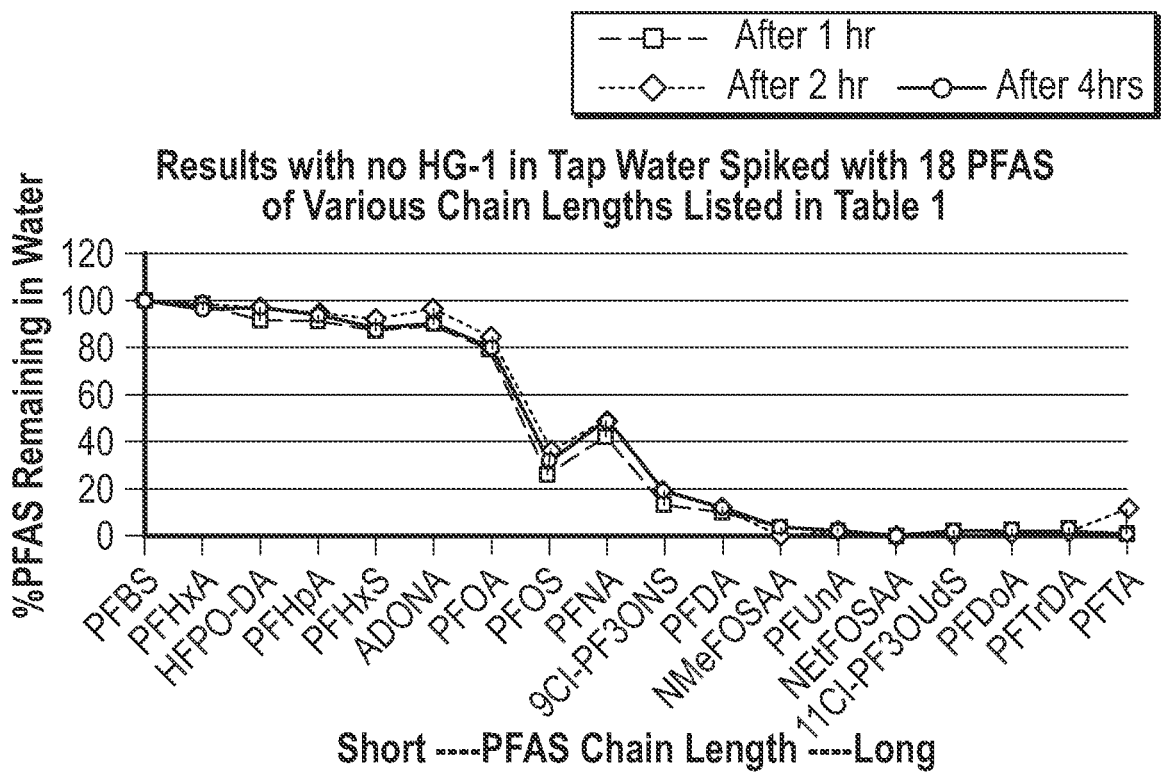
FIG. 1 shows the results of a control experiment (Example 1) with no poly(alkylamine) ammonium salt (designated HG-1).

Before explaining at least one embodiment of the presently disclosed and claimed inventive concept(s) in detail, it is to be understood that the presently disclosed and claimed inventive concept(s) is not limited in its application to the details of construction and the arrangement of the components, steps or methodologies set forth in the following description or illustrated in the drawings. The presently disclosed and claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed and claimed herein can be made and executed without undue experimentation in light of the present disclosure. While the articles and methods of the presently disclosed and claimed inventive concept(s) have been described in terms of particular embodiments, it will be apparent to those of skill in the art that variations may be applied to the articles and/or methods and in the steps or in the sequence of steps of the method described herein without departing from the concept, spirit and scope of the presently disclosed and claimed inventive concept(s). All such similar substitutes and modifications apparent to those skilled in the art are deemed to be within the spirit, scope and concept of the presently disclosed and claimed inventive concept(s) as defined by the appended claims.

As utilized in accordance with the present disclosure, the following terms, unless otherwise indicated, shall be understood to have the following meanings:

Use of the word "a" or "an" when used in conjunction with the term "comprising" in the claims and/or the specification may mean "one," but it is also consistent with the meaning of "one or more," "at least one," and "one or more than one." Use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

The sorbent materials to be used according to the inventive concept(s) described herein are crosslinked polymeric ammonium salts. Such sorbent materials may also be referred to as a copolymer network or as poly(alkylamine) derived ionomer hydrogels as discussed in more detail below. The term "copolymer" is used herein to mean a polymer synthesized from two or more monomers none of which will self-polymerize under synthesis reaction conditions. The term "self-supported" or "self-supporting" is used herein to mean that the crosslinked polymeric ammonium salts described and claimed herein do not require an independent or separate support material to be effective PFAS sorbents according to the claimed method. The term "crosslinked" is used herein to mean a polymer which has a network structure. A common test to determine if a polymer is crosslinked is to attempt to dissolve the polymer in a liquid that is normally a solvent for that polymer. Linear or branched; but not crosslinked, polymers will dissolve in the solvent. Crosslinked polymers typically do not dissolve, although they may swell to some degree. The polymeric ammonium salts described herein, when not crosslinked, are generally soluble in water or other polar solvents. When crosslinked, the polymeric ammonium salts swell in water, often to form gel-like materials and exhibit a swell factor of at least about 2. The crosslinked, co-polymerized ammonium salts form a water insoluble solid polyelectrolyte.

Crosslinked polymeric ammonium salts according to the inventive concept(s) described herein will be composed of hydrocarbylene segments, which can contain from 2 to 50 carbon atoms, and are connected by ionic ammonium species. It is believed that the length of the connecting hydrocarbylene segments should match closely with the length of the target PFAS molecules to attain maximum efficiency of absorption. By matching polymeric chain lengths to PFAS length, and with the presence of ammonium ions, the amphiphilic PFAS chains will be provided with maximum opportunity for interactions via both lipophilic (hydrocarbylene chains) and ionic (ammonium ions) modes to maximize the efficacy of absorption of any given PFAS. Additionally, polymer swell will allow the entire mass of the polymer to be accessible to PFAS molecules, further enhancing the efficiency of absorption.

For use as a PFAS sorbent, the crosslinked polymeric ammonium salts described and claimed for use herein may be used in dry or nearly dry form or swollen in water. It is preferred if the polymeric ammonium salt used has a swell factor of at least about 2, preferably about 5 to 25 and more preferably about 10 to 15 because polymer swell will allow full access of the target PFAS molecules to the entire mass of polymer for very efficient use of all active sites within the polymer. Swell will vary with the conditions employed. A higher swell may be preferred for more stagnant (decanting) situations; whereas a lower swell may be preferred for column type situations, which require lower pressure conditions for processing. Swell factor is a value which corresponds to the ratio of the weight of water imbibed by the polymer divided by the weight of the dry polymer used. It is believed that crosslinked polymeric ammonium salts that swell to the preferred levels have certain advantages for use in dynamic flow situations in towers due to pressure requirements.

The term "ionomer" is used herein to mean a chemical structure having a nitrogen atom bonded to four other atoms. For example, in an ammonium ion, the nitrogen is bonded to four hydrogen atoms. In a primary ammonium ion, the nitrogen atom is bonded to three hydrogen atoms and one carbon atom. In a secondary ammonium ion, the nitrogen atom is bonded to two carbon atoms and two hydrogen atoms. In a tertiary ammonium ion, the nitrogen atom is bonded to three carbon atoms and one hydrogen atom. Finally, in a quaternary ammonium ion, the nitrogen atom is bonded to four carbon atoms.

In the cross-linked polymeric ammonium salts according to the inventive concept(s) described herein, at least 25% of the ammonium nitrogen atoms are secondary ammonium nitrogen atoms, preferably at least about 40% because secondary ammonium nitrogen atoms are associated with linear polymer segments, which reflect how well the polymer swells. A lower percentage of these nitrogen atoms will provide a low swelling polymer, and a higher number of these nitrogen atoms will be associated with polymer that either swells excessively or is predominantly soluble. Nitrogen atoms in linear polymer segments also allow closer access to their positive charge by the hydrophilic portion of PFAS molecules, resulting in stronger adsorption, than is allowed by tertiary or quaternary ammonium nitrogen atoms.

According to another embodiment, primary ammonium nitrogen atoms comprise 15% to 25%, secondary ammonium nitrogen atoms comprise 40% to 60%, tertiary ammonium nitrogen atoms comprise 15% to 25%, and quaternary ammonium nitrogen atoms comprise less than 5%, of the total number of ammonium nitrogen atoms in the ionomer.

Each nitrogen atom of the ionomer has one positive charge, and a corresponding counter ion. The counter ion may be any negative ion whose conjugate (Bronsted) acid is capable of protonating the conjugate base of the ammonium salt. Different counterions will provide different levels of hygroscopicity. Suitable compatible, counterions include, by way of example, chloride, bromide, iodide, sulfate, phosphate, acetate, ascorbate, carbonate, bicarbonate, nicotinate, salicylate, tartrate and citrate. Chloride ion is an especially preferred counterion due to its low molecular weight and environmental safety.

The nitrogen atoms of the ammonium salts (ions) of the ionomer are located between polymer segments, unless they are end groups. At least about 25% of these groups, designated herein as Y, linking the nitrogen atoms are independently selected from n-alkylene groups having 2 to about 20 carbon atoms. The term "n-alkylene group" is used herein to mean the group —$(CH_2)_b$— wherein the value of bis from 2 to about 20. The n-alkylene group Y may also be substituted with alkyl groups, whereby it is a branched alkylene group. Hydrocarbylene groups of varying lengths may be used and preferred, depending on the target length of the PFAS molecules targeted for absorption/removal.

The other pairs of nitrogen atoms of the cross-linked polymeric ammonium salts to be used according to the inventive concept(s) described herein are connected by hydrocarbylene groups, designated herein as Z, containing 2 or more carbon atoms, preferably 2 to 50 carbon atoms, which may be contained in branched and/or cyclic structures, e.g., at least two carbon atoms are positioned between the nitrogen atoms. The term "hydrocarbylene" is used herein to mean a group that contains only carbon and hydrogen. The hydrocarbylene group Z may be substituted by various substituents. Contemplated substituents include, by way of example, ether, ester amino, thioether, keto, silyl group and/or heterocyclic rings. R is preferred if the hydrocarbylene group Z is an n-alkylene group containing 2 to 14 carbon atoms in order to fully maximize interactions with linear PFAS molecules. It is also preferred if the substituents contain 1 to 50 carbon atoms, more preferably 1-30 carbon atoms to allow more efficient polymer swell.

One method of preparing the cross-linked polymeric ammonium salts according to the inventive concept(s) described herein is by reacting an organic dihalide with a diamine, both of whose amine groups are primary amines. For the purposes of this disclosure, the organic dihalide can be represented by X—Y—X, where X is chlorine, bromine or iodine (bromine is preferred due to its reactivity with aliphatic diamines), and Y is the group to which both halogen atoms are bound.

The diamine is represented by $H_2N$—Z—$NH_2$, where Z is the group to which the two amino groups are bound. The diamine and dihalide react to form a copolymer, as shown in the equation below, which results in the alternation of Y and Z groups between amine nitrogen atoms.

In order to optimally obtain the desired sorbent polymer, it has been

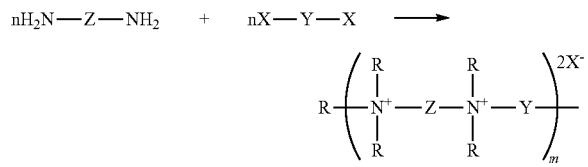

X = Br or I
R = H or Y (repeat unit)

found that the Y group should be of such a size that the halogen atoms are the equivalent of at least 7 or more methylene groups spaced apart, that is to say be separated by 7 methylene groups or spaced an equivalent distance if not separated by methylene groups. It is believed that if this minimum separation of the halogen atoms is not achieved, the dihalide will tend to "back bite" after the first halogen has reacted with an amine, and thereby result in an undesirable cyclic structure. Thus, it is often convenient (but not necessary) that the dihalide structure be X—Y—X.

Dihalides useful according to the described and claimed inventive concept(s) are selected from the group consisting of, for example, 1,10-dibromodecane, 1,12-dibromododecane, 1,8-dibromooctane, 1,18-dibromooctadecane, 1,9-dibromononane, 1,7-dibromoheptane, 1,8-diiodooctane, 1,8-dibromo-3-ethyloctane, and 1,9-dibromodecane. Useful diamines include, but are not limited to, ethylene diamine, 1,6-diaminohexane, 1,12-diaminododecane, 2-methyl-1,5-diaminopentane, 1,4-bis(aminomethyl)cyclohexane, 1,3-diaminopentane, diethylene triamine, triethylene tetramine, 1,4-bis(3-aminopropyl)piperazine, 1,4-cyclohexanediamine, 5-amino-1-aminomethyl-1,3,3-trimethylcyclohexane, 1,3-propanediamine, 1,4-butanediamine, 1,5-pentanediamine, 1,7-heptanediamine, 1,8-diaminooctane, 1,9-diaminononane, 1,10-diaminodecane, 1,11-diaminoundecane, 2-hydroxy-1,3-propanediamine, and 4,4'-methylene-bis(cyclohexylamine). More than one diamine and/or dihalide may be used in the reaction, so long as the limitations imposed on the polymeric structure are met, for example, at least about 25% of the total groups Y and Z should be Y.

Cross-linked polymeric ammonium salts to be used according to the inventive concept(s) can also be made by reacting a diamine with a di-epoxide. In this case, it is the diamine in which the nitrogen atoms are connected by an n-alkylene group (which may be alkyl substituted) containing 2 to about 20 carbon atoms. After synthesis of these polymers, the resulting amines are converted to ammonium salts by introducing an acid into the reaction.

The cross-linked polyamines (and their salts), as described herein, may have nitrogen atoms that are further substituted, typically by reaction with substituted or unsubstituted alkyl halides to form, for example, secondary amine (salts) from primary amines, and tertiary amines from secondary amines. However, in the resulting polyamine (salt), 25% or more of the amino (ammonium) nitrogen atoms should still be secondary to allow desirable swell properties. The group Q, which is further substituted on a nitrogen, is a hydrocarbyl group containing 1 to 50 carbon atoms, and may contain one or more other substituents selected from the group consisting of hydroxy, ether, amino, thioether, keto, silyl groups and/or heterocyclic rings. It is preferred if Q contains 1-30 carbon atoms to promote desirable swell properties.

The cross-linked polymeric ammonium salts can be made from the above described diamines and dihalides or di-epoxides by dissolving the reactants in a solvent, typically a polar solvent, such as, for example, methanol, ethanol, N,N-dimethylformamide, N,N-dimethylacetamide, dimethylsulfoxide, tetrahydrofuran, water, and mixtures thereof. Temperatures are not critical, so that temperatures in the range of from ambient up to the boiling points of the solvent (or lower boiling ingredient) will produce satisfactory results. Depending on the temperature, reactants and solvent, reaction is complete in a few minutes to a few days, but typically from about 1 to 8 hours. The reaction may be followed by observing the viscosity of the solution, which will gradually increase until a gel is formed or the polymeric product precipitates. If the polymer does not precipitate (whereby it can be isolated by filtration), the polymer can be recovered from the resulting solution by adding the solution to a solvent in which the linear polymer would not be soluble. For example, tetrahydrofuran can be used as a solvent, and the polymer will precipitate.

It is desirable in this process to use approximately equimolar amounts of the diamine and dihalide. The process is preferably carried out under an inert gas blanket to avoid undesired oxidation of the amines. If it is desired to change the counter ion of the polymer, this can be accomplished by adding a solvent (e.g., water) to swell the gel, adding a base, such as ammonium hydroxide or sodium hydroxide (NaOH), to form a salt with the original counterion (and de-swell the gel), removing the salt by filtration and washing, and then re-acidifying with the conjugate acid of the counterion desired to reform a swollen gel. Procedures of this type are known to those skilled in the art.

In processes for preparing the cross-linked polymeric ammonium salts to be used according to the inventive concept(s) described herein, a small amount of the reactants may become polymeric, but not crosslinked. If it is desired to remove the un-crosslinked (and therefore soluble) fraction from the reaction product, removal can be accomplished by extracting the polymeric ammonium salt with a solvent in which the un-crosslinked polymer dissolves, such as, for example, water or methanol (MeOH). See for instance Example 1. Cross-link density (as measured by a polymer's swell factor in water) can be controlled by judicious use of solvents, temperature and reaction time. Some solvents (e.g. $H_2O$, EtOH), when used alone, produce polymers that swell very little in water. Mixtures of solvents, and solvents such as MeOH, can produce highly swellable polymers. Short reaction times and/or lower temperatures produce less cross-linking and a higher degree of swelling.

Cross-linking can also be accomplished by using small amounts of tri- or higher functionality amines or halides. Cross-linking can also be accomplished by exposing the uncross-linked polymeric ammonium salt to ionizing radiation.

In the embodiment described above, the cross-linked polymeric ammonium salts should preferably have a swell factor of at least about 2 to 4 in water which will allow target PFAS molecules full access to the mass of the polymer via adequate swell. The degree of swellability of the polymer can be determined by three material factors. One factor is the degree of salt formation in the polymer, that is, what percentage of the amino nitrogen atoms present are in their salt form. The higher this percentage, the more the polymer will swell. It is preferred if at least 80% of the amino groups are in their salt form, and more preferred if at least about 90% are in the salt form for improved swellability. Use of the term "cross-linked polymeric ammonium salts" is intended to include a polymer wherein at least about 50% of the amino groups in the polymer are in their salt form.

Another factor which can influence or control swellability is the hydrophilicity of the groups between nitrogen atoms. Generally, the more carbon atoms these groups contain, the less hydrophilic they are, and the less the polymer will swell in water. Another controlling factor is crosslink density. Typically, higher crosslink density will produce polymer that will swell less.

Reaction conditions during polymer synthesis and handling affect the swell factor. Thus, swell increases with decreasing monomer concentration in the reaction solution, undergoing a sharp increase at high dilution. The reaction time is also important. The reactants react to form a higher molecular weight and more crosslinked polymer at longer incubation times. Reaction temperature contributes to molecular weight growth, with elevated reaction temperatures producing polymers with higher molecular weight (more crosslinks) in shorter periods of time. The workup procedure can also remove low molecular weight polymer and decreases swell. Washing the product with aqueous base, then with acid, shrinks and re-swells the polymer, squeezing out soluble components. A further reduction in swell is observed after continuously extracting the polymer with an organic solvent, followed by water, in a Soxhlet apparatus.

The choice of solvent for the polymerization can have a material effect on the swellability of the final product. A swell factor of essentially zero is obtained in media which do not allow the reactants to dissolve. Swell factor is very low in interfacial systems in which dibromodecane is dissolved in an organic phase and hexamethylenediamine in water. The swell factor can be increased slightly by neutralizing the acid by-product which is generated. Formation of higher swell polymers is promoted by solvents, which dissolve both reactants, especially dipolar, aprotic solvents.

On occasions where a crosslinked polymeric ammonium salt(s) is to be deployed with a flocculent and/or a coagulant, the flocculent or coagulant can be selected from organic or inorganic and ionic or nonionic readily available materials. The examples which follow will explain in more detail the various embodiments of the inventive concept(s) described and claimed herein.

Example 1: PFAS Absorption as a Function of PFAS Chain Length with 100 mg of Poly(Alkylamine) Ammonium Salt (Designated HG-1)

A sample of poly(alkylamine) ammonium salt (HG-1) was prepared from hexamethylene diamine and 1,10-dibromodecane, using DMF/methanol as the solvent, according to the method described in U.S. Pat. No. 5,633,344. The sample was tested in a mix of 18 PFAS compounds listed in Table 1 that are prescribed in the drinking water test by the U.S. Environmental Protection Agency (EPA) in method 537.1. Method 537.1 is a solid phase extraction (SPE) liquid chromatography/tandem mass spectrometry (LC/MS/MS) method for the determination of selected per- and polyfluorinated alkyl substances (PFAS) in drinking water.

TABLE 1

| Analyte | Acronym | CAS Registry Number |
|---|---|---|
| 11-Chloroeicosafluoro-3-oxaundecane-1-sulfonic acid | 11Cl-PF3OUdS | 763051-92-9 |
| 9-Chlorohexadecafluoro-3-oxanonane-1-sulfonic acid | 9Cl-PF3ONS | 756426-58-1 |
| 4,8-Dioxa-3H-perfluorononanoic acid | ADONA | 919005-14-4 |
| Hexafluoropropylene oxide dimer acid (Gen X) | HFPO-DA | 13252-13-6 |

TABLE 1-continued

| Analyte | Acronym | CAS Registry Number |
|---|---|---|
| Perfluorobutanesulfonic acid | PFBS | 375-73-5 |
| Perfluorodecanoic acid | PFDA | 335-76-2 |
| Perfluorododecanoic acid | PFDoA | 307-55-1 |
| Perfluoroheptanoic acid | PFHpA | 375-85-9 |
| Perfluorohexanoic acid | PFHxA | 307-24-4 |
| Perfluorohexanesulfonic acid | PFHxS | 355-46-4 |
| Perfluorononanoic acid | PFNA | 375-95-1 |
| Perfluorooctanoic acid | PFOA | 335-67-1 |
| Perfluorooctanesulfonic acid | PFOS | 1763-23-1 |
| Perfluoroundecanoic acid | PFUnA | 2058-94-8 |
| N-ethyl perfluorooctanesulfonamidoacetic acid | NEtFOSAA | 2991-50-6 |
| N-methyl perfluorooctanesulfonamidoacetic acid | NMeFOSAA | 2355-31-9 |
| Perfluorotetradecanoic acid | PFTA | 376-06-7 |
| Perfluorotridecanoic acid | PFTrDA | 72629-94-8 |

30 mL of tap water and 0.2 mL of 40 ng/mL of EPA 537.1 mixed standard was added to 100 mg of cross-linked polymeric ammonium salt (HG-1) in a polypropylene (PP) 50-mL tube. 30 mL of tap water+0.2 mL of 40 ng/mL EPA 537.1 mixed standard was made up as a control. All samples were put on a wrist-action shaker. 1-mL aliquots were taken after 1, 2 and 4 hours and were then centrifuged at 10,000 rpm for 2 minutes. The samples were then analyzed by LC-MS/MS vs. a standard made up in methanol.

FIG. 1 shows the results of the control experiment with no HG-1. The Figure shows the percentage of PFAS remaining in the water after 1, 2 and 4 hours as a function of chain length of PFAS. FIG. 1 shows that without any HG-1, 100% of PFAS with chain length of less than 8 carbon atoms (PFOA) remain in the water whereas the amount of longer chain PFAS in water is reduced. This is due to migration and adherence of longer chain (longer than Ce) PFAS to the walls of the PP tube. The phenomenon of adherence of longer chain PFAS to the walls of the PP tube has been reported (Powley, C R et al., 2006, Organo-halogen Compounds, 68, 1688).

Figure 2:
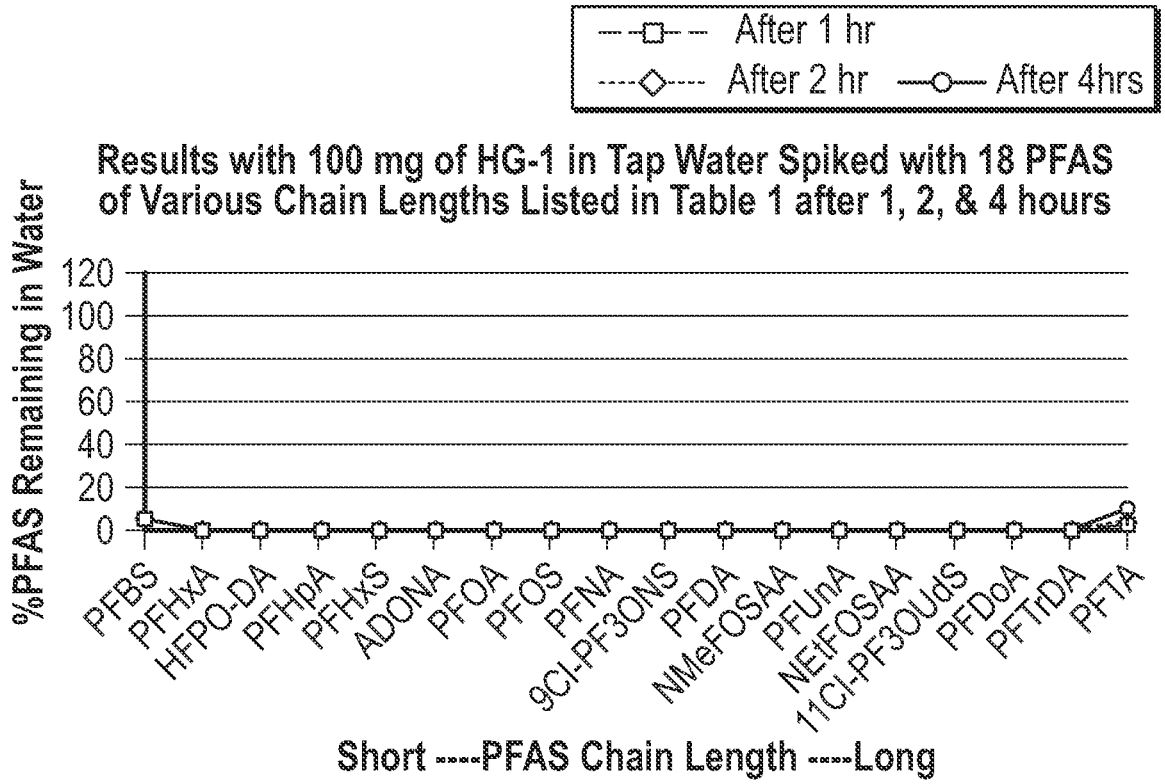
FIG. 2 shows the results of an experiment (Example 1) with 100 mg of HG-1 in tap water spiked with 18 PFAS of various chain lengths after 1, 2, and 4 hours.

FIG. 2, which shows results with 100 mg of sample HG-1, demonstrates that nearly 100% of PFAS are absorbed and 0% of PFAS remain in the water even within one hour of exposure of the mixture. FIG. 2 illustrates the amount (%) of PFAS remaining in tap water spiked with a mix of PFAS in EPA method 537.1 (Table 1) after 1, 2 and 4 hours of treatment with 100 mg of HG-1

Example 2: Experiment with 50 mg of Poly(Alkylamine) Ammonium Salt (HG-1)

Figure 3:
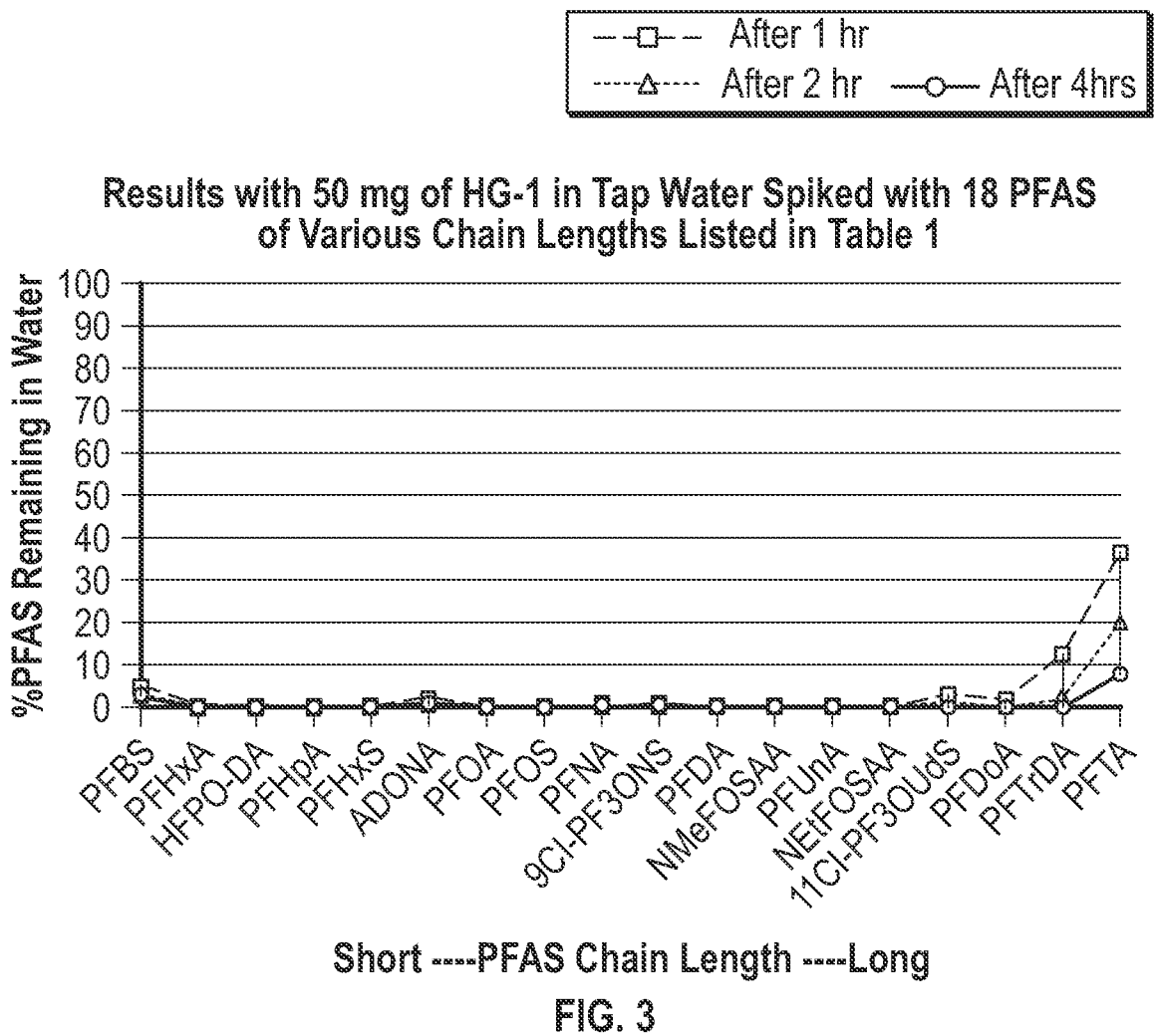
FIG. 3 shows the results of an experiment (Example 2) with 50 mg of HG-1 in tap water spiked with 18 PFAS of various chain lengths after 1, 2, and 4 hours.

30 mL of tap water and 0.2 mL of 40 ng/mL EPA 537.1 mixed standard was added to 50 mg of hydrogel (HG-1) in a PP 50-mL tube. 30 mL tap water+0.2 mL of 40 ng/mL EPA 537.1 mixed standard was made up as a control. All samples were put on a wrist-action shaker. 1-mL aliquots were taken after 1, 2 & 4 hours and centrifuged at 10,000 rpm for 2 min. The samples were then analyzed by LC-MS/MS vs a standard made up in methanol. Results in FIG. 3 show that even at half of the original quantity (100 mg) of HG-1, all short chain PFAS are similarly removed from the sample even in one hour.

Example 3

Experiment with 20 mg of HG-1 in tap water spiked with a mix of PFAS in EPA method 533 which contains more shorter chain PFAS than in method 537.1, as well as Fluoro telomer alcohol PFAS of the type used in aqueous firefighting foams.

30 mL of tap water and 0.2 mL of 40 ng/mL of a mixed PFAS standard used in EPA method 533 was added to 20 mg of hydrogel (HG-1) in a PP 50-mL tube. The mix of PFAS in EPA method 533 contained more shorter chain PFAS than specified in EPA method 537.1, as well as a few Fluoro telomer alcohols. The mix of analytes in 533 is shown in Table 2.

30 mL tap water+0.2 mL of 40 ng/mL EPA method 533 mixed standard was made up as a control. All samples were put on a wrist-action shaker. 1-mL aliquots were taken after 1, 2 and 4 hours and then centrifuged at 10,000 rpm for 2 min. The samples were then analyzed by LC-MS/MS vs. a standard made up in methanol.

30 mL of tap water and 0.2 mL of 40 ng/mL EPA method 533 (Table 2) mixed standard was added to 20 mg of hydrogel (HG-1) in a PP 50-mL tube. 30 mL tap water+0.2 mL of 40 ng/mL EPA 537.1 mixed standard was made up as a control. All samples were put on a wrist-action shaker. 1-mL aliquots were taken after 1, 2 & 4 hrs. They were allowed to settle and then centrifuged at 10,000 rpm for 2 min. The samples were then analyzed by LC-MS/MS vs. a standard made up in methanol.

TABLE 2

Analyte List

| Analyte* | Abbreviation | CASRN |
|---|---|---|
| 11-Chloroeicosafluoro-3-oxaundecane-1-sulfonic acid | 11Cl-PF3OUdS | 763051-92-9 |
| 9-Chlorohexadecafluoro-3-oxanonane-1-sulfonic acd | 9Cl-PF3ONS | 756426-58-1 |
| 4,8-Dioxa-3H-perfluorononanoic acid | ADONA | 919005-14-4 |
| Hexafluoropropylene oxide dimer acid | HFPO-DA | 13252-13-6 |
| Nonafluoro-3,6-dioxaheptanoic acid | NFDHA | 151772-58-6 |
| Perfluorobutanoic acid | PFBA | 375-22-4 |
| Perfluorobutanesulfonic acid | PFBS | 375-73-5 |
| 1H,1H,2H,2H-Perfluorodecane sulfonic acid | 8:2FTS | 39108-34-4 |
| Perfluorodecanoic acid | PFDA | 335-76-2 |
| Perfluorododecanoic acid | PFDoA | 307-55-1 |
| Perfluoro(2-ethoxyethane)sulfonic acid | PFEESA | 113507-82-7 |
| Perfluoroheptanesulfonic acid | PFHpS | 375-92-8 |
| Perfluoroheptanoic acid | PFHpA | 375-55-9 |
| 1H,1H,2H,2H-Perfluorohexane sulfonic acid | 4:2FTS | 757124-72-4 |

TABLE 2-continued

Analyte List

| Analyte* | Abbreviation | CASRN |
|---|---|---|
| Perfluorohexanesulfonic acid | PFHxS | 355-46-4 |
| Perfluorohexanoic acid | PFHxA | 307-24-4 |
| Perfluoro-3-methoxypropanoic acid | PFMPA | 377-73-1 |
| Perfluoro-4-methoxybutanoic acid | PFMBA | 863050-89-5 |
| Perfluorononanoic acid | PFNA | 375-95-1 |
| 1H,1H,2H,2H-Perfluorooctane sulfonic acid | 6:2FTS | 27519-97-2 |
| Perfluorooctanesulfonic acid | PFOS | 1763-23-1 |
| Perfluorooctanoic acid | PFOA | 335-57-1 |
| Perfluoropentanoic acid | PFPeA | 2706-90-3 |
| Perfluoropentanesulfonic acid | PFPeS | 2705-91-4 |
| Perfluoroundecanoic acid | PFUnA | 2058-94-8 |

Figure 4:
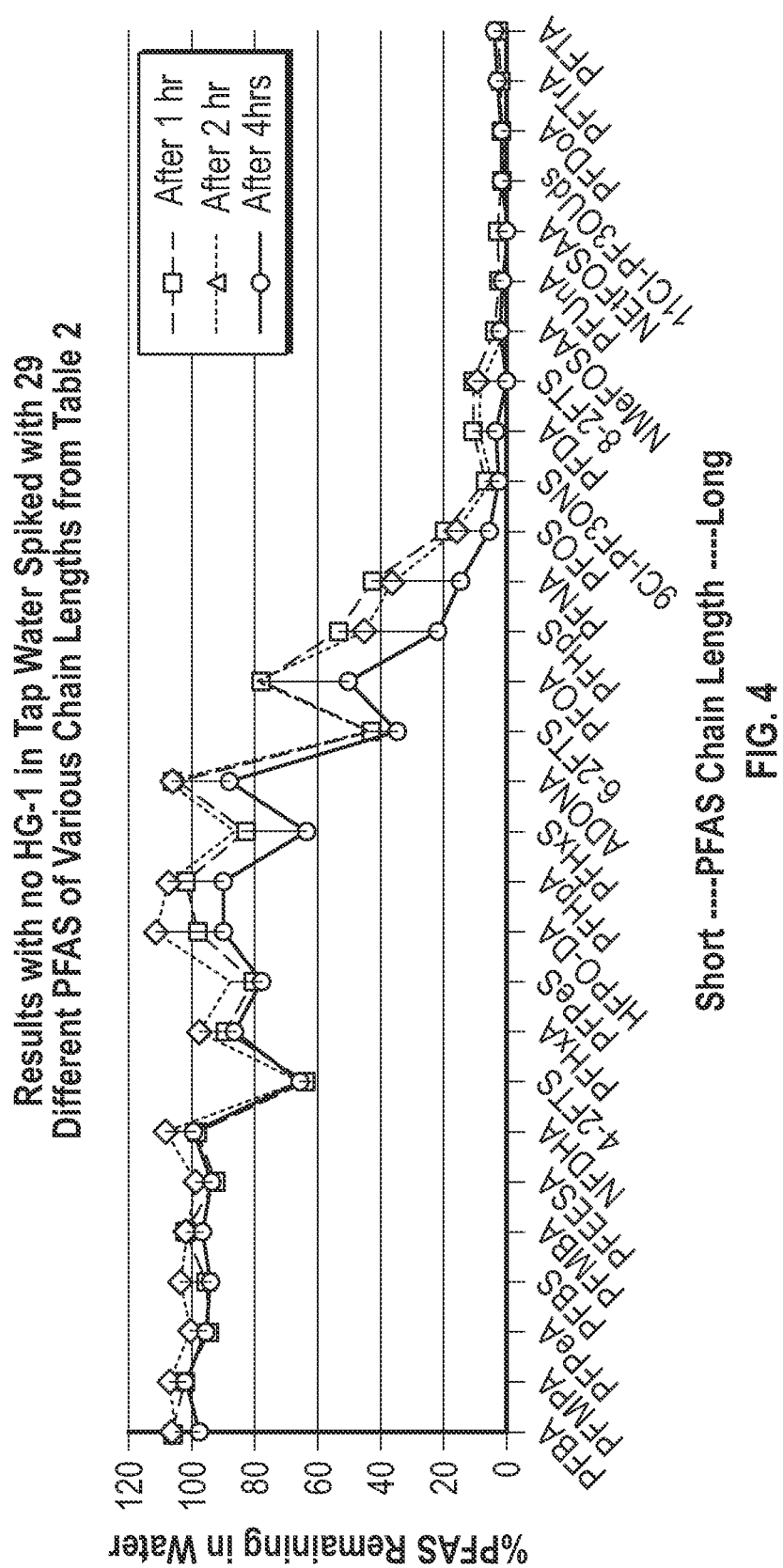
FIG. 4 shows the results of an experiment (Example 3) with no HG-1 in tap water spiked with 29 different PFAS of various chain lengths after 1, 2, and 4 hours.

Results of the control experiment with no HG-1 are shown in FIG. 4. The graph shows the percentage of PFAS remaining in the water after 1, 2 & 4 hours as a function of chain length in water spiked with a mix from Table 2. This experiment shows that without HG-1, PFAS with chain length of less than 8 carbon atoms remain in the water as expected, whereas the amount of longer chain PFAS is reduced. This is due to migration and adherence of longer chain PFAS to the walls of the PP tube. The phenomenon of adherence of longer chain PFAS to the walls of the PP tube has been reported before (Powley, C R et al., 2006, Organohalogen Compounds, 68, 1688).

Figure 5:
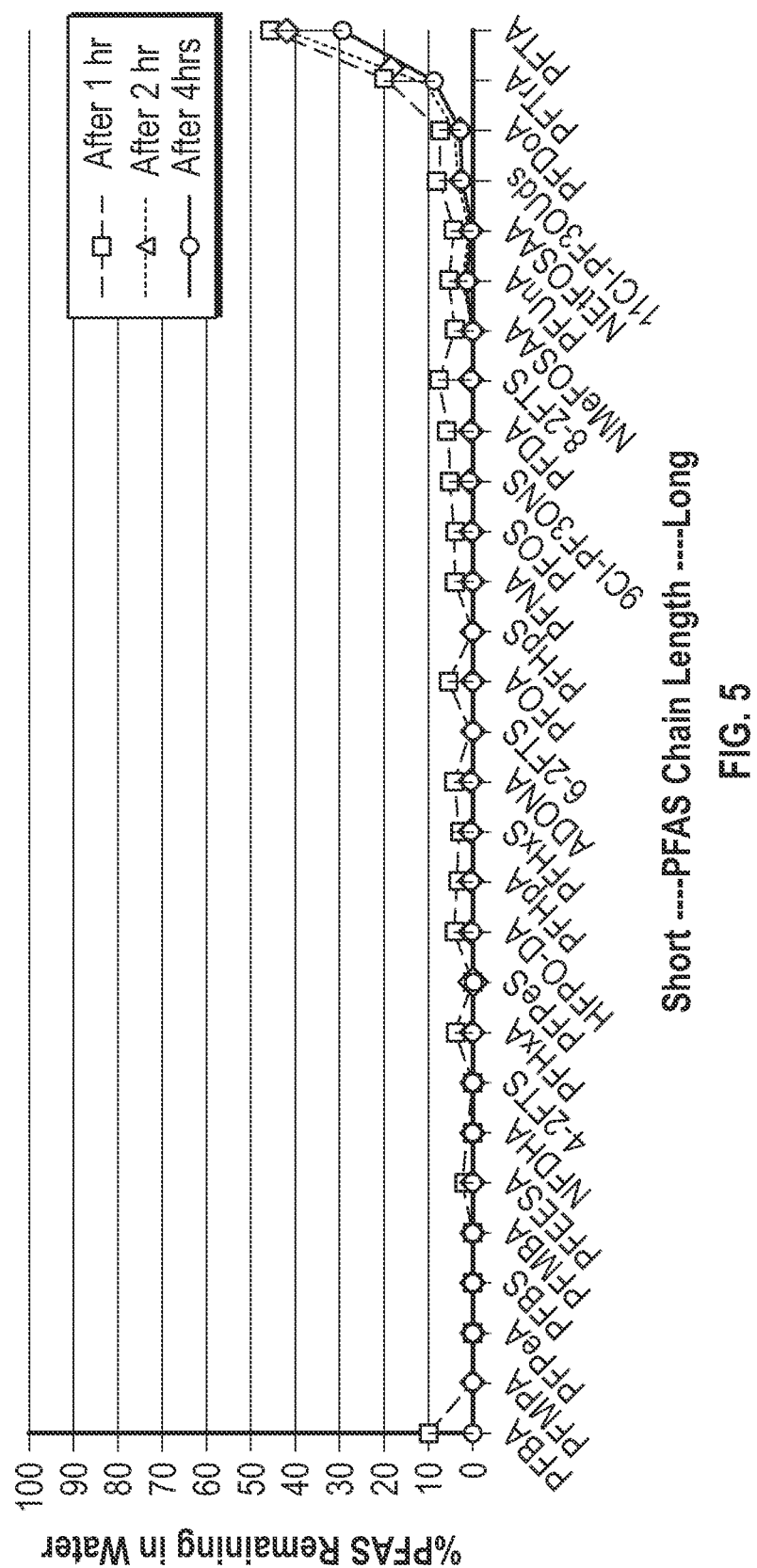
FIG. 5 shows the results of an experiment (Example 3) with 20 mg of HG-1 in tap water spiked with 29 different PFAS of various chain lengths after 1, 2, and 4 hours.

FIG. 5 shows the results with 20 mg of HG-1 in tap water spiked with a mix of PFAS in EPA method 533. With the exception of longer chain PFTA and PFTrA components, the graph shows 100% reduction of all PFAS analytes in comparison to the amounts seen in FIG. 4. These results demonstrate that HG-1 is highly effective at absorbing shorter chain PFAS in EPA method 533, including the fluorotelomers used in aqueous fire-fighting foams, and, secondly, it is effective even at 20% of the amount of HG-1 used in Experiment 1.

Example 4

PFAS absorption as a function of PFAS chain length in EPA standard method 533 with 10 mg of Poly(alkylamine) ammonium salt (HG-1). 30 mL of tap water and 0.2 mL of 40 ng/mL EPA method 533 (Table 2) mixed standard was added to 10 mg of hydrogel (HG-1) in a PP 50-mL tube. 30 mL tap water+0.2 mL of 40 ng/mL EPA 537.1 mixed standard was made up as a control. All samples were put on a wrist-action shaker. 1-mL aliquots were taken after 1, 2 and 4 hours. They were allowed to settle and centrifuged at 10,000 rpm for 2 min. The samples were then analyzed by LC-MS/MS vs. a standard made up in methanol.

Figure 6:
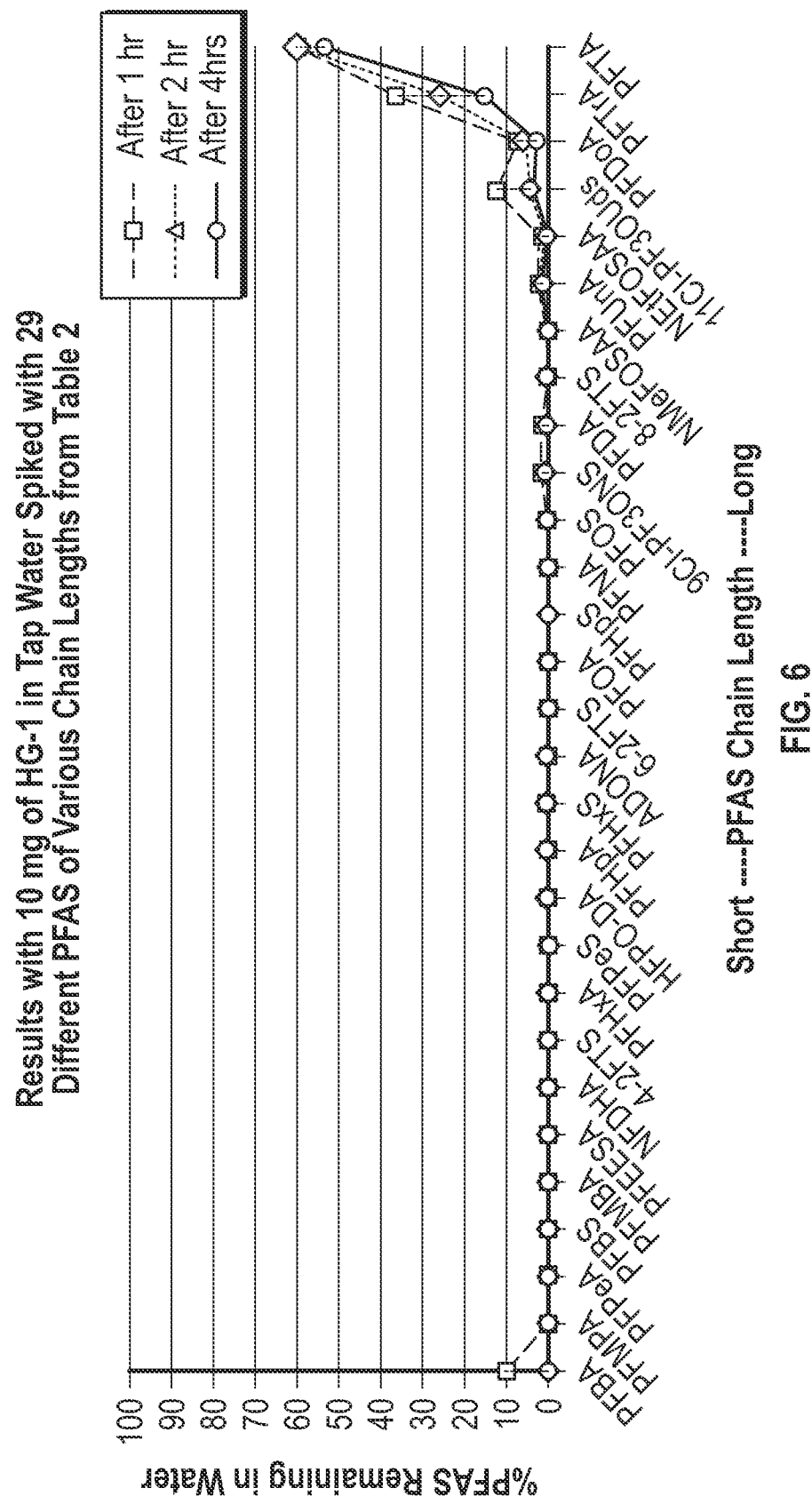
FIG. 6 shows the results of an experiment (Example 4) with 10 mg of HG-1 in tap water spiked with 29 different PFAS of various chain lengths after 1, 2 and 4 hours.

FIG. 6 shows that at a concentration of only 10% of the original quantity (100 mg) of HG-1, all short chain PFAS are removed from the spiked tap water sample.

Tests in Well Water

Example 5

A test was conducted with HG-1 in well water taken from the vicinity of an airport and air national guard site with a history of AFFF use. The well water (Well 1) contained much higher amounts of PFAS than in the experiments using tap water listed above. The well water also contained a different mix of PFAS as shown in Table 3, as well as other organic matter, such as Humic acid.

TABLE 3

|  | Reported Level (ng/L) |
|---|---|
| PFBS | 177 |
| PFHXA | 580 |
| HFPO-DA | <2 |
| PFHpA | 263 |
| PFHxs | 2220 |
| ADONA | ND |
| PFOA | 466 |
| PFOS | 3150 |
| PFNA | 72 |
| PFDA | 4 |

30 mL of well water (Table 3) with no HG-1 was added to a PP 50-ml tube. All samples were put on a wrist-action shaker. 1-mL aliquots were taken after 1 & 2 hours. They were allowed to settle and centrifuged at 10,000 rpm for 2 minutes. The samples were then analyzed by LC-MS/MS vs. a standard made up in methanol.

Figure 7:
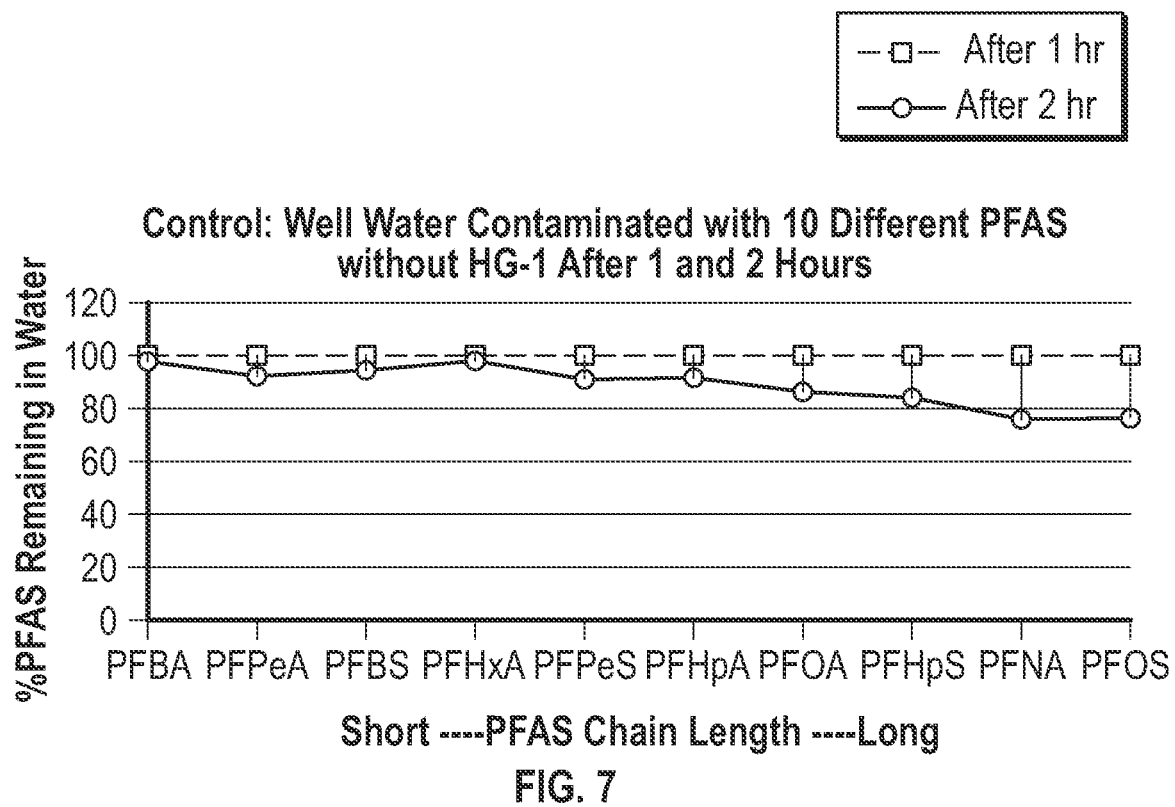
FIG. 7 shows the results from an experiment (Example 5) using well water contaminated with 10 different PFAS and no HG-1 which demonstrates that some of the longer chain PFAS do not remain in water due to migration towards the wall of a PP tube.

Results shown in FIG. 7 demonstrate that some of the longer chain PFAS do not remain in water due to migration towards the wall of the PP tube.

Figure 8:
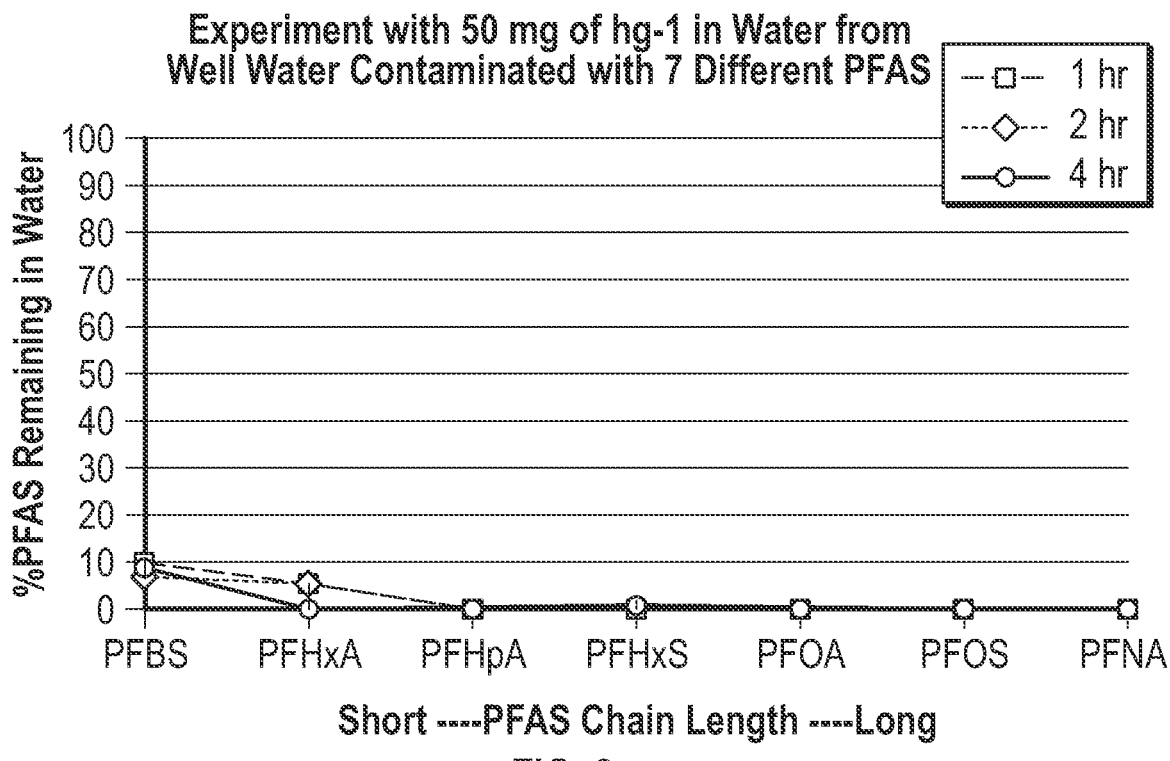
FIG. 8 shows the results from an experiment (Example 5) with 50 mg of HG-1 in well water contaminated with 7 different PFAS after 1, 2 and 4 hours.

To test the efficacy of HG-1 to remove PFAS from well water, 30 mL of well water (Table 3) with 50 mg of HG-1 was added to a PP 50-ml tube. All samples were put on a wrist-action shaker. 1-mL aliquots were taken after 1 & 2 hours. They were allowed to settle and then centrifuged at 10,000 rpm for 2 minutes. The samples were then analyzed by LC-MS/MS vs. a standard made up in methanol. Results in FIG. 8 show that HG-1 is effective in absorbing, i.e., removing, short chain PFAS in water from wells near an airport where aqueous fire-fighting foams were used.

Figure 9:
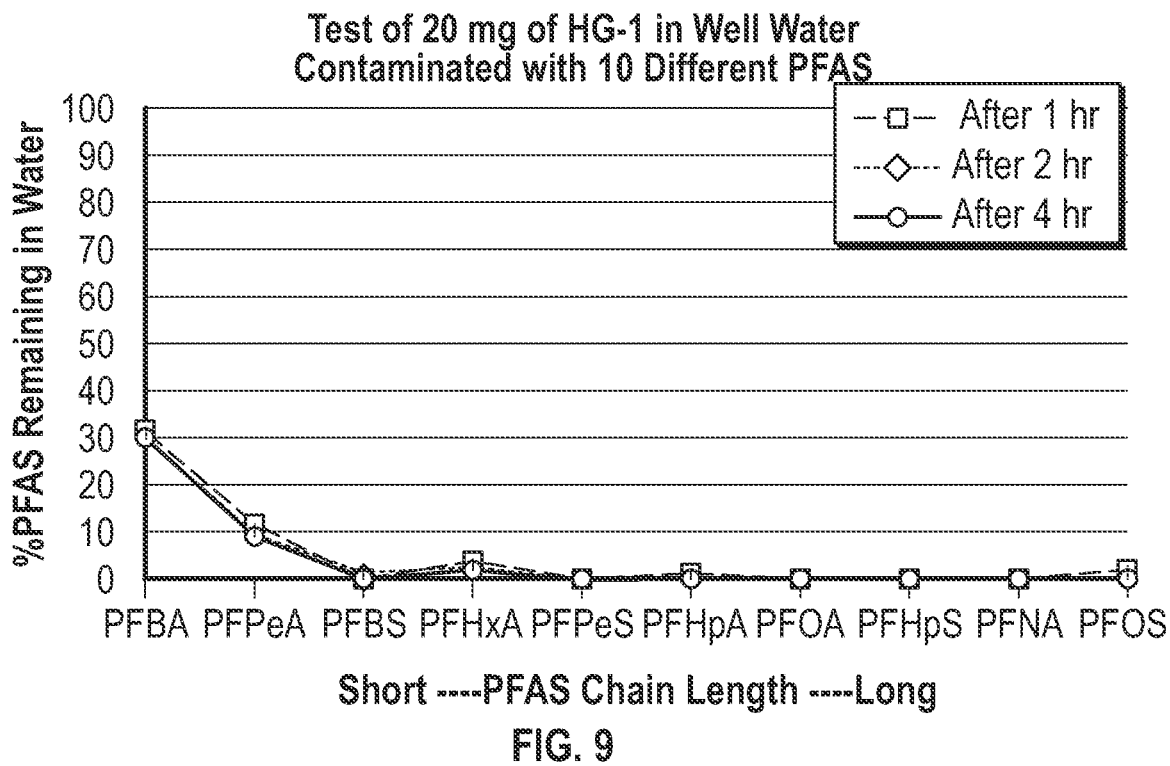
FIG. 9 shows the results from an experiment (Example 6) with 20 mg of HG-1 in well water contaminated with 10 different PFAS after 1, 2 and 4 hours.

Example 6: Test of 20 mg of HG-1 in Well Water (Well 2) in the Vicinity of an Airport and Air National Guard Site with a History of AFFF Use 30 mL of well water from a well (Well 2) that had a higher level of PFAS contamination than in Example 5 was added to 20 mg of HG-1 in a PP 50-ml tube. All samples were put on a wrist-action shaker. 1-mL aliquots were taken after 1, 2 and 4 hours. They were allowed to settle and then centrifuged at 10,000 rpm for 2 minutes. The samples were then analyzed by LC-MS/MS vs. a standard made up in methanol. Results in FIG. 9 show that HG-1 is equally effective in absorbing, i.e., removing, PFAS compounds from well water with a high level of PFAS contamination.

Example 7: Test of 10 mg of HG-1 in Well Water (Well 2) from the Vicinity of an Airport and Air National Guard Site with a History of AFFF Use 30 mL of well water from Well 2 was added to 10 mg of HG-1 in a PP 50-ml tube. All samples were put on a wrist-action shaker. 1-mL aliquots were taken after 1, 2 and 4 hours. They were allowed to settle and then centrifuged at 10,000 rpm for 2 minutes. The samples were then analyzed by LC-MS/MS vs. a standard made up in methanol. Results shown in FIG. 9 show that HG-1 is equally effective in well water with high level of PFAS contamination.

Figure 10:
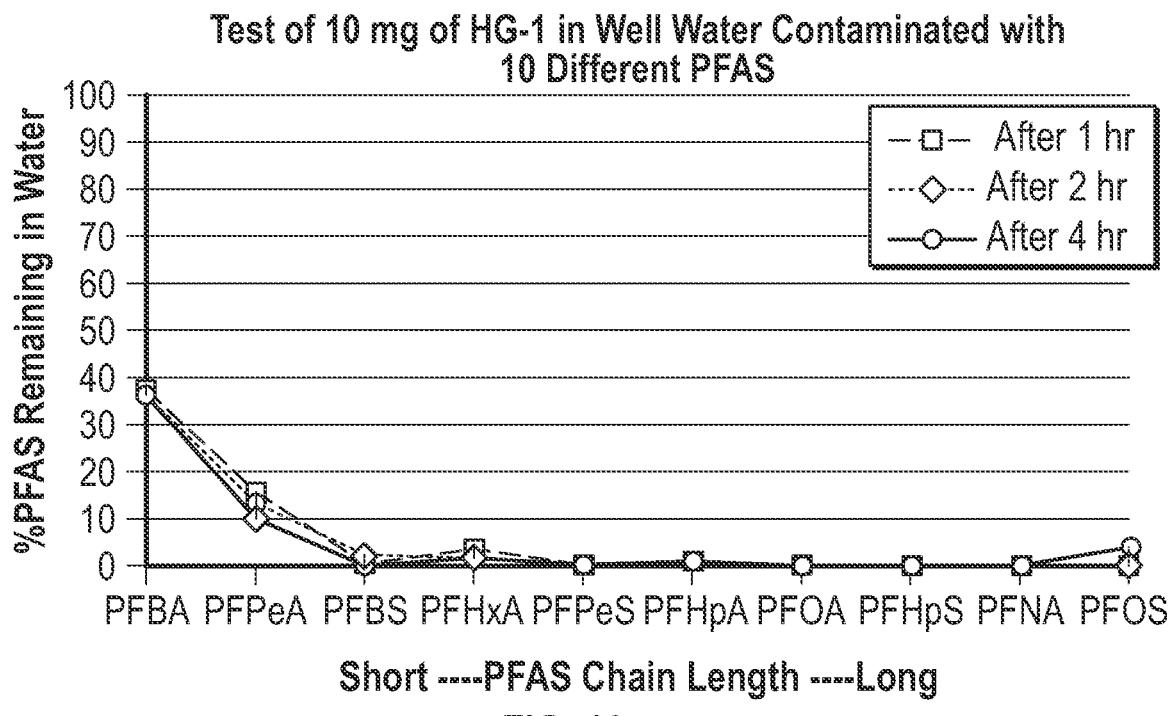
FIG. 10 shows the results from an experiment (Example 7) with 10 mg of HG-1 in well water contaminated with 10 different PFAS after 1, 2 and 4 hours.

Results in FIG. 10 show that 10 mg of HG-1 is capable of absorbing, i.e., removing, shorter chain sulfonates (with four carbons) upwards to PFAS compounds with nine carbons.

Experiments to Demonstrate Release of PFAS from Sorbent (HG-1) and Recovery of PFAS from Sorbent Example 8

PFAS release (i.e., desorption, recovery) from HG-1 was demonstrated using samples from Example 2 (50 mg of HG-1 in tap water spiked with a mix of PFAS in EPA method 537.1). After the absorption experiment was completed, the remaining water was removed from the settled hydrogel by aspiration. Then HG-1 was treated with 30 mL of 2% ammonium hydroxide in methanol. After one hour of shaking, the samples were centrifuged, and an aliquot of the ammonium hydroxide/methanol solution was evaporated, reconstituted in methanol and then analyzed by HPLC/Mass spectrometry.

Figure 11:
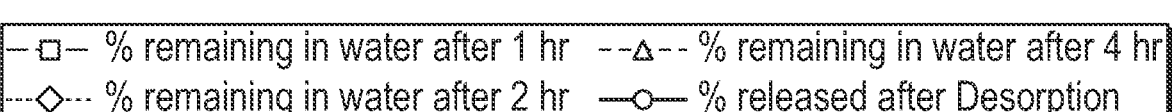
FIG. 11 shows the results from an experiment (Example 8) to demonstrate the release of PFAS from HG-1 and recovery of the PFAS from the HG-1 sorbent.
Figure 11:
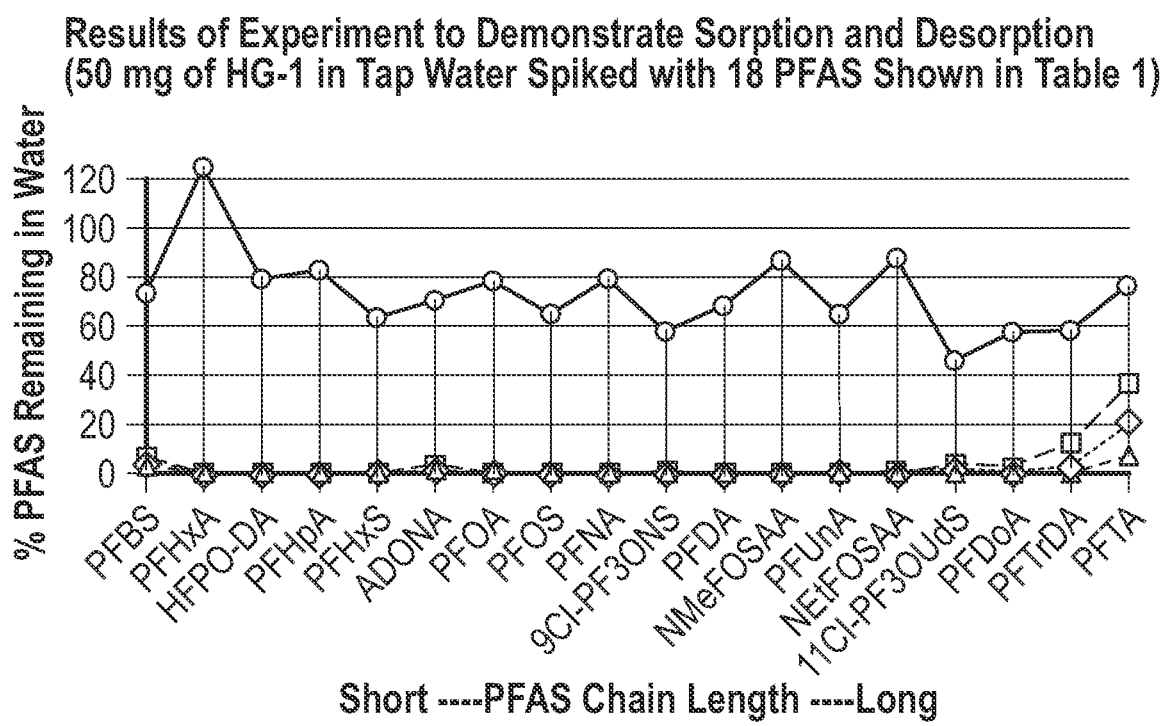

FIG. 11 shows the % of PFAS in the water after absorption by HG-1 at 1, 2 and 4 hours and after desorption of the PFAS by treatment with ammonium hydroxide/methanol desorption at 4 hours. Results in FIG. 11 show that nearly all PFAS are desorbed (i.e., recovered).

Example 9

Results of an experiment to demonstrate absorption of PFAS by HG-1 (samples from experiment 5 with 50 mg) in water from well water contaminated with PFAS followed by desorption. After the absorption experiment was completed, the remaining water was removed from the settled hydrogel by aspiration. Then HG-1 was treated with 30 mL of 2% ammonium hydroxide in methanol. After one hour of shaking, the samples were centrifuged, and an aliquot of the ammonium hydroxide/methanol solution was evaporated, reconstituted in methanol and then analyzed by HPLC/Mass spectrometry.

Figure 12:
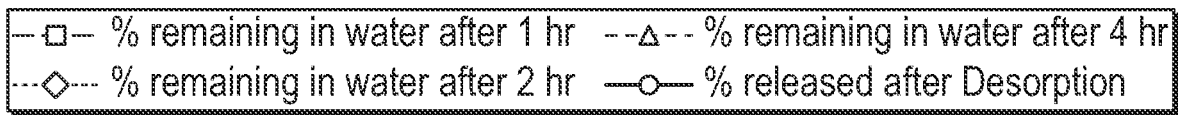
FIG. 12 shows the results from an experiment (Example 9) to demonstrate the absorption of 7 PFAS from contaminated well water with 50 mg of HG-1 and recovery of the PFAS from the HG-1 sorbent.
Figure 12:
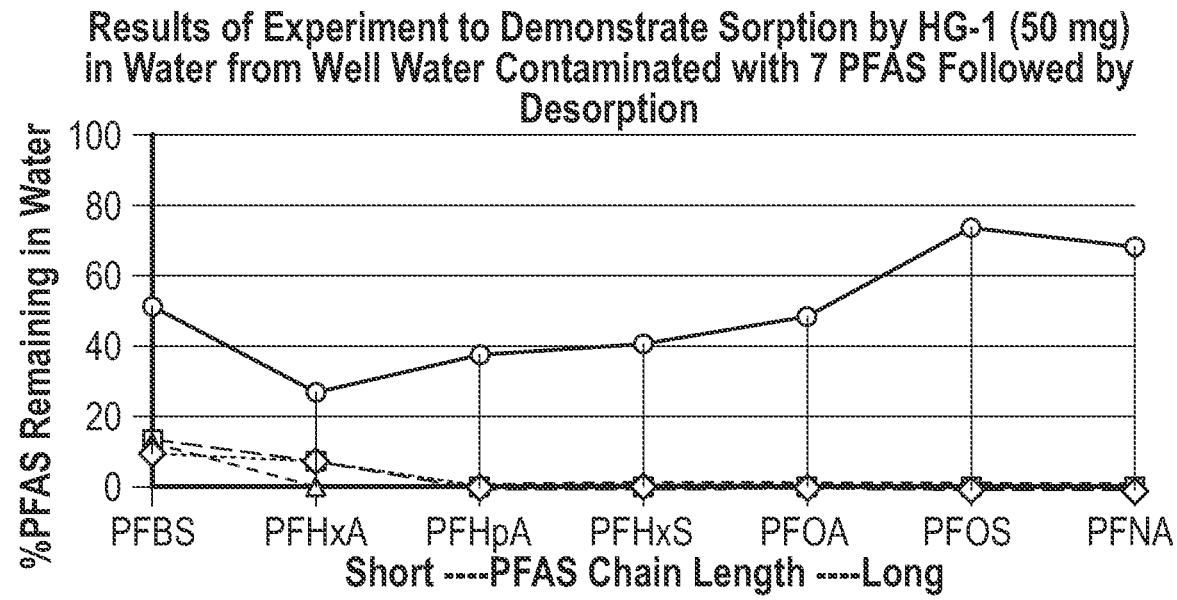

FIG. 12 shows the % of PFAS in the water after absorption by HG-1 at 1, 2 and 4 hours and after desorption of the PFAS by treatment with ammonium hydroxide in methanol after 4 hours. Results in FIG. 12 show that substantially all PFAS are desorbed (i.e., recovered).

Example 10: Product Made by Alternate Synthetic Methods

Experiments were conducted to test efficacy of absorption and desorption of products made by alternate synthetic methods. Two polymer samples, designated HG-2 and HG-3, were subject to absorption and desorption experiments in well water as described previously. HG-2 and HG-3 were prepared using the same ingredients as were used in preparing HG-1, but with THF as solvent.

Figure 13:
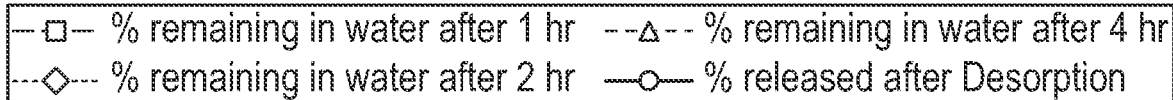
FIG. 13 shows the results from an experiment (Example 10) to demonstrate the absorption of 18 PFAS of varying chain lengths from spiked tap water with 100 mg of a poly(alkylamine) ammonium salt (designated HG-2) and recovery of the PFAS from the HG-2 sorbent.
Figure 13:
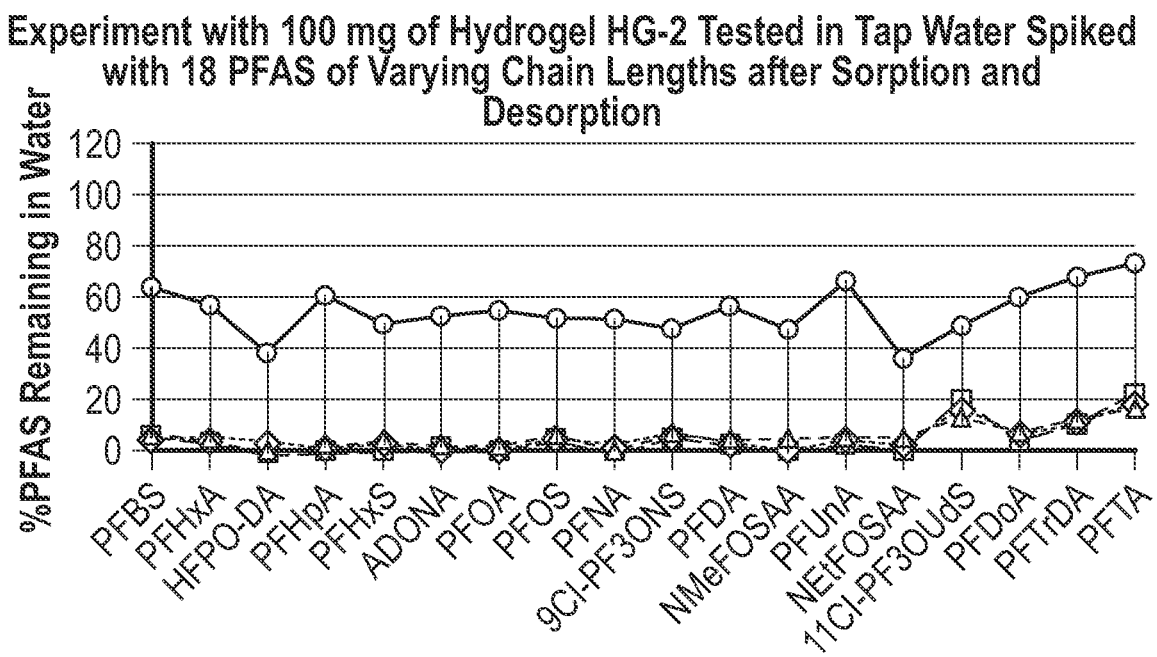
Figure 14:
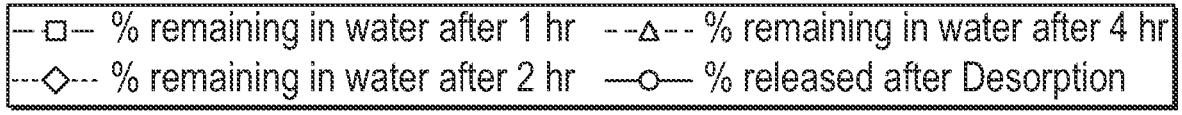
FIG. 14 shows the results from an experiment (Example 10) to demonstrate the absorption of 18 PFAS of varying chain lengths from spiked tap water with 100 mg of a poly(alkylamine) ammonium salt (designated HG-3) and recovery of the PFAS from the HG-3 sorbent.
Figure 14:
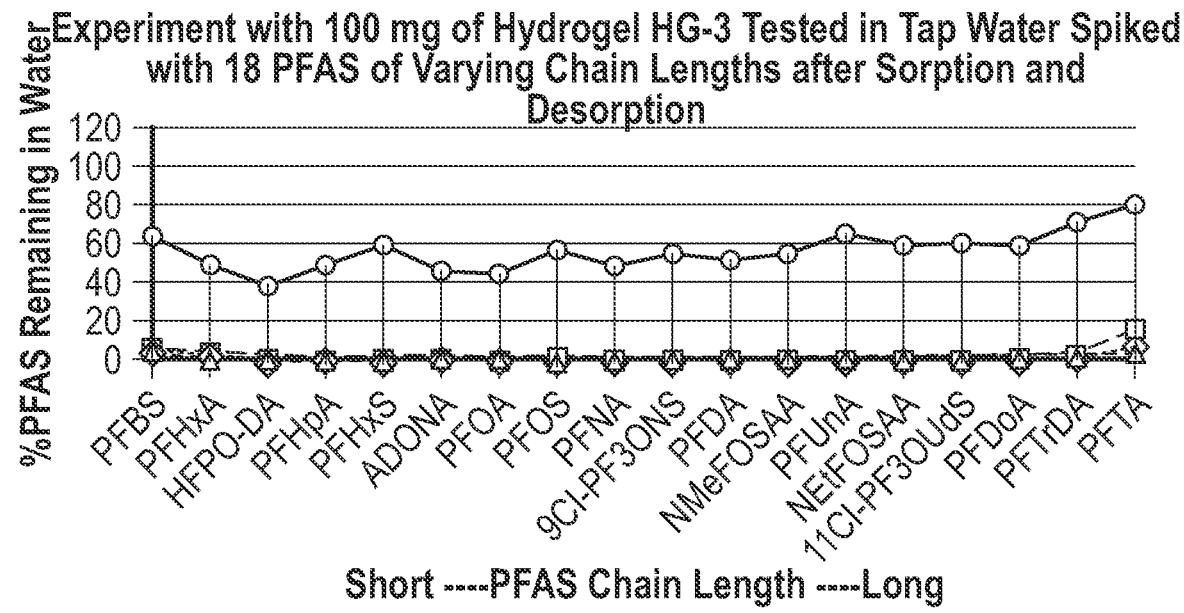
Figure 15:
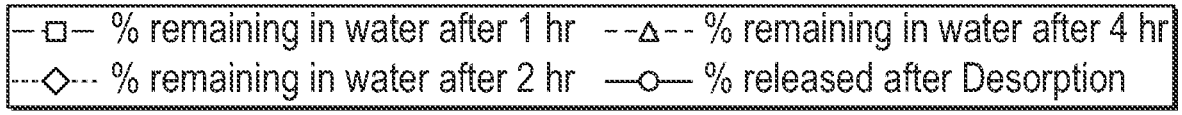
FIG. 15 shows the results from an experiment (Example 10) to demonstrate the absorption of 18 PFAS of varying chain lengths from spiked tap water with 50 mg of HG-3 and recovery of the PFAS from the HG-3 sorbent.
Figure 15:
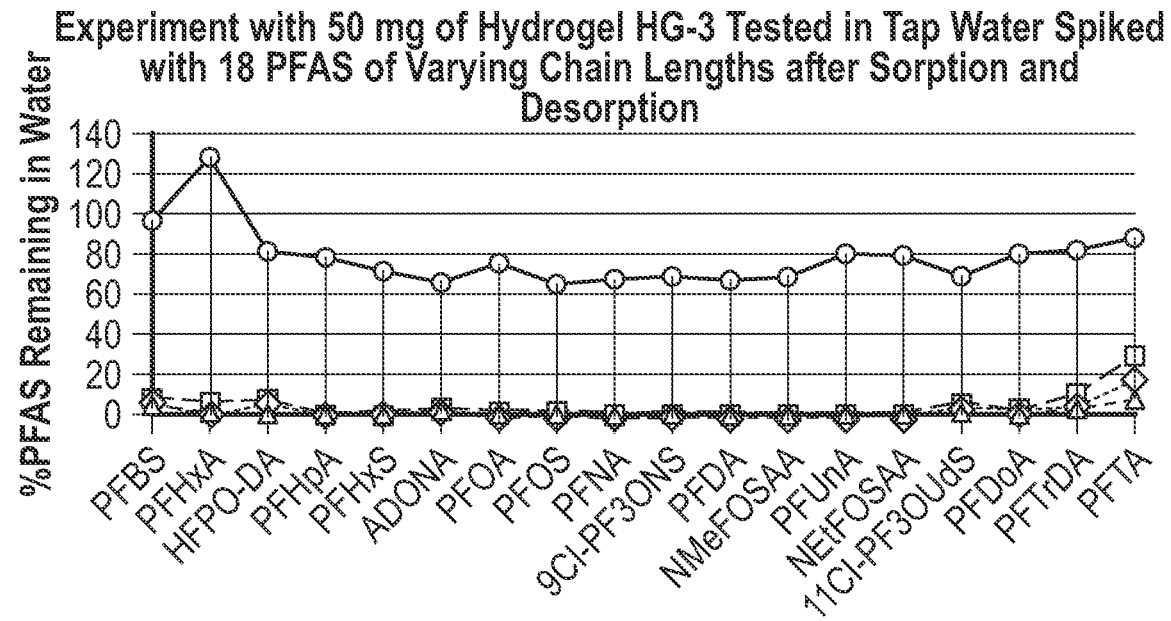

Results in FIGS. 13 through 15 demonstrate that polymer HG-2 made according to the alternate synthetic process, is also very effective in absorption of all PFAS compounds.

Example 11—Sorption Experiment to Assess the Effect of Increasing the Cross-Link Density of the Ammonium Salts on PFAS Sorption Ammonium salts (i.e., ionomers) were synthesized following the procedure described in U.S. Pat. No. 5,633,344 using different molar ratios of dibromodecane and hexamethylene diamine monomers ranging from equimolar amounts of the two monomers, and 4% and 6.3% molar excess of the dibromodecane to vary the cross-link density of the ionomer sorbent.

For each sorbent to be studied, 10 mg of each was weighed out into a 50-mL polypropylene centrifuge tube (each tube is referred to herein as a reactor). 30 mL of HPLC-grade water was added to each reactor, followed by 0.3 mL of 10 ng/mL EPA 533 PFAS mixture. Each reactor was shaken by hand for 15 seconds and the contents were allowed to settle for 5 minutes. After settling, 0.5-mL samples were taken by pipette and placed into 2 mL microcentrifuge tubes that contained 0.5 mL methanol and internal standard. Samples were centrifuged for 2 minutes at 10,000 rpm. All reactors were then placed on a wrist-action shaker for 1 hour. After 2 hours, reactor contents were allowed to settle for 5 minutes, and a sample was collected using the same methods described for the first sample. These samples were analyzed by LC-MS/MS vs. a standard in methanol solution.

Figure 16:
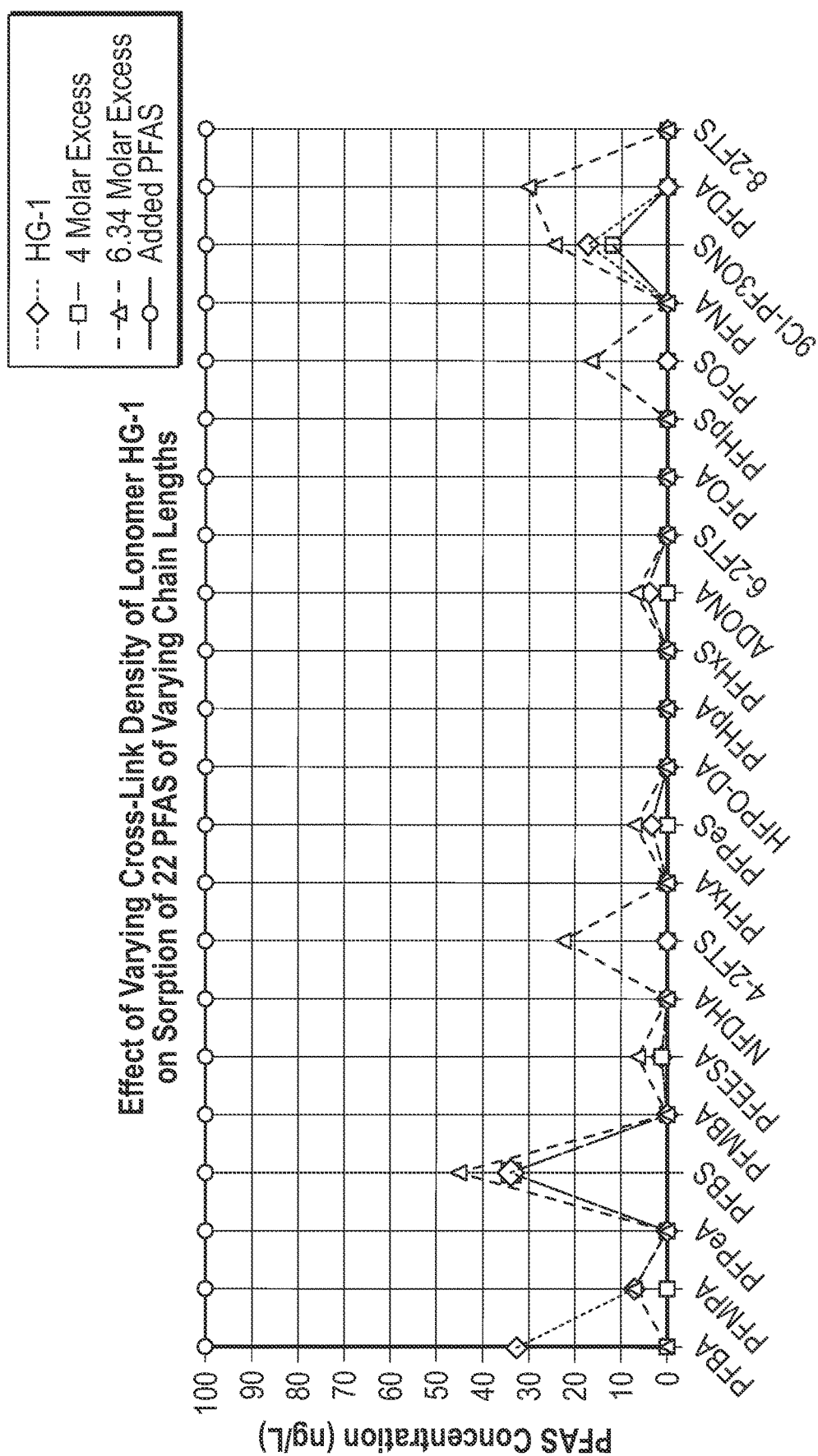
FIG. 16 shows the results from an experiment (Example 11) to demonstrate that cross-link density may influence PFAS absorption.

FIG. 16 shows concentrations of PFAS after 2 hours of exposure. The data show that cross-link density may influence PFAS sorption.

Example 12—Experiment to Compare the Performance of Poly(Alkylamine) Ammonium Salt (HG-1) to Remove PFAS from Well Water Contaminated by PFAS from Aqueous Fire-Fighting Foam, Against Granular Activated Carbon (GAC) and Ion Exchange Resin (IAX)

Well water from a well near an Air National Guard site, which was tested by LC/MS/MS and shown to contain PFAS compounds, was used for this experiment. The amounts of PFAS in the well water are shown in Table 3 below.

TABLE 3

|  | Reported Concentration (ng/L) |
| --- | --- |
| PFBA | 11 |
| PFPeA | 30 |
| PFBS | 19 |
| PFHxA | 48 |
| PFPeS | 19 |
| PFHpA | 11 |
| PFHxS | 116 |
| 6-2 FTS | 72 |
| PFHpS | 14 |
| PFOS | 139 |
| PFOA | 53 |
| TOTAL | 513 |

200 mg of poly(alkylamine) ammonium salt (HG-1) was weighed into a polypropylene beaker and then 200 mL HPLC-grade water was added. The HG-1 and water solution was mixed for 30 minutes prior to taking 1 mL of solution to obtain 1 mg/mL of HG-ionomer while stirring. This 1 ml of HG-1 ionomer solution was added to a 125 mL PP bottle containing 99 mL of well water. For comparative purposes, 40 mg of HG-1 ionomer, GAC, and IAX were weighed into 125-mL PP bottles containing 100 mL of well water. The bottles were shaken by hand for 10 seconds and their contents allowed to settle for 1 minute. The bottles were then sampled by pipetting 1 mL into a microcentrifuge tube containing an internal standard. The microcentrifuge tubes were centrifuged for 2 minutes at 10,000 rpm, and then 0.9 mL of centrifuged sample was pipetted for analysis. The bottles were then placed on a wrist-action shaker for 1 hour. After 1 hour, another sample was taken from the bottles, in the methods described above. These samples were analyzed by LC-MS/MS vs. a standard in methanol solution.

Figure 17:
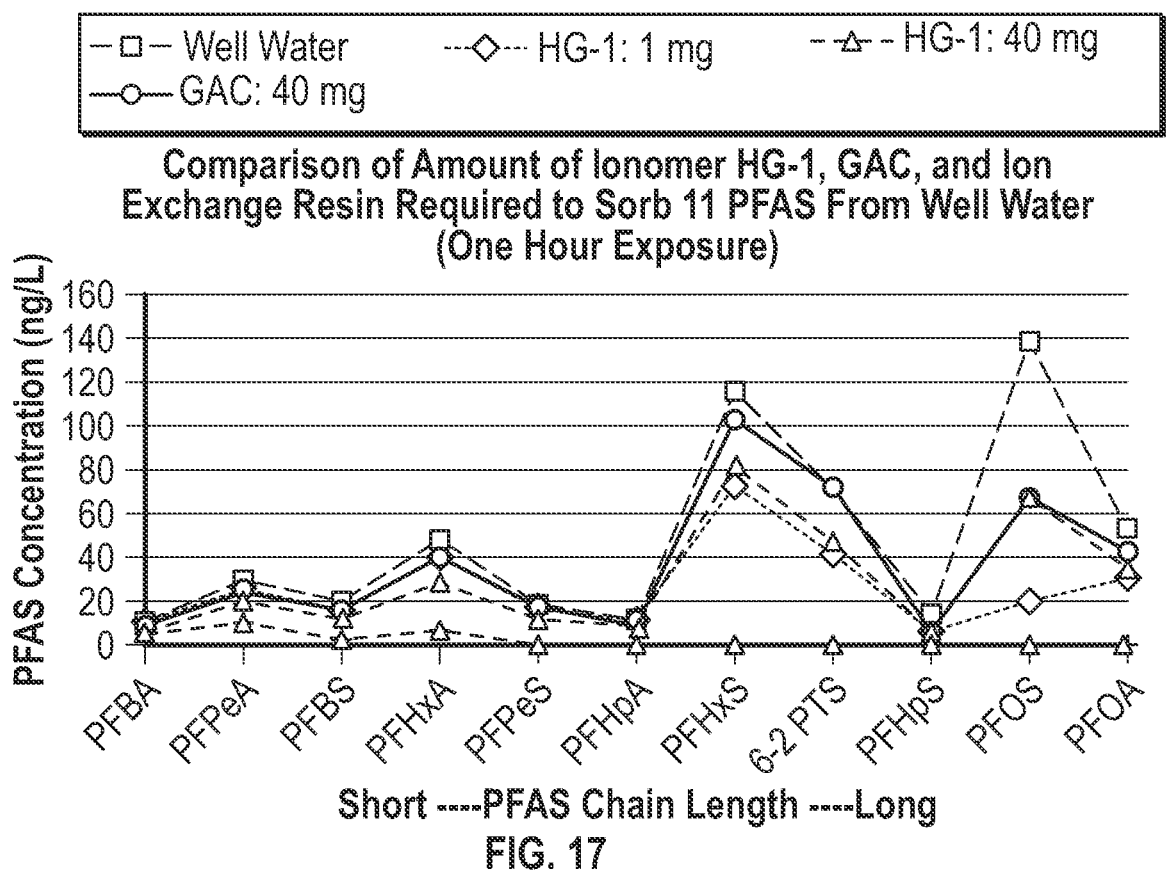
FIG. 17 shows the results from an experiment (Example 12) to demonstrate the performance of HG-1 in removing PFAS from contaminated well water against Granular Activated Carbon (GAC) and Ion Exchange Resin (IAX) after a one-hour exposure.

FIG. 17 shows the results of PFAS sorption from well water tested with 1 mg and 40 mg of HG-1 and 40 mg of GAC and IAX. The data in FIG. 17 shows concentrations of PFAS in solution after 1 hour of exposure to the sorbents. The data shows that 1 mg HG-1 performed as well as 40 mg of ion exchange resin. 40 mg of HG-1 nearly completely cleared all PFAS from the well water after 1 hour.

Example 13—Performance of Poly(Alkylamine) Ammonium Salt, Wherein the Poly(Alkylamine) Ammonium Salt was Prepared from Polyethylene Imine and Dibromodecane Using DMF/Methanol as Solvent (Designated HG-5) According to the Procedure Described in U.S. Pat. No. 5,633,344, Against GAC and IAX to Remove Perfluoro-Octanoic Acid (PFOA)

200 mg HG-5 was placed in a polypropylene beaker, and 200 mL HPLC-grade water was then added to form a solution. The solution was mixed for 30 minutes prior to removing 1 mL for the study. A control reactor was created by mixing 100 mL HPLC-grade water with 0.1 mL 1 ug/mL perfluoro-actanoic acid (PFOA) solution in a 125-mL polypropylene bottle. For GAC and IAX, 8 mg of each was weighed into 125 mL bottles and 100 mL water and 0.1 mL 1 ug/mL PFOA solution were added. For HG-5, 1 mL of sorbent slurry was added to a bottle containing 99 mL water and 0.1 mL 1 ug/mL PFOA solution. The bottle reactors were shaken by hand for 10 seconds and the contents allowed to settle for 1 minute before sampling. After settling, 1 mL of solution was pipetted from each bottle into microcentrifuge tubes, centrifuged for 2 minutes at 10,000 rpm, and then 0.9 mL of each sample was analyzed by HPLC-MS/MS. The first sample was the time 0 sample. Bottles were placed on a wrist-action shaker and sampled as described above at time intervals of 1, 2, 4, and 6 hours.

Figure 18:
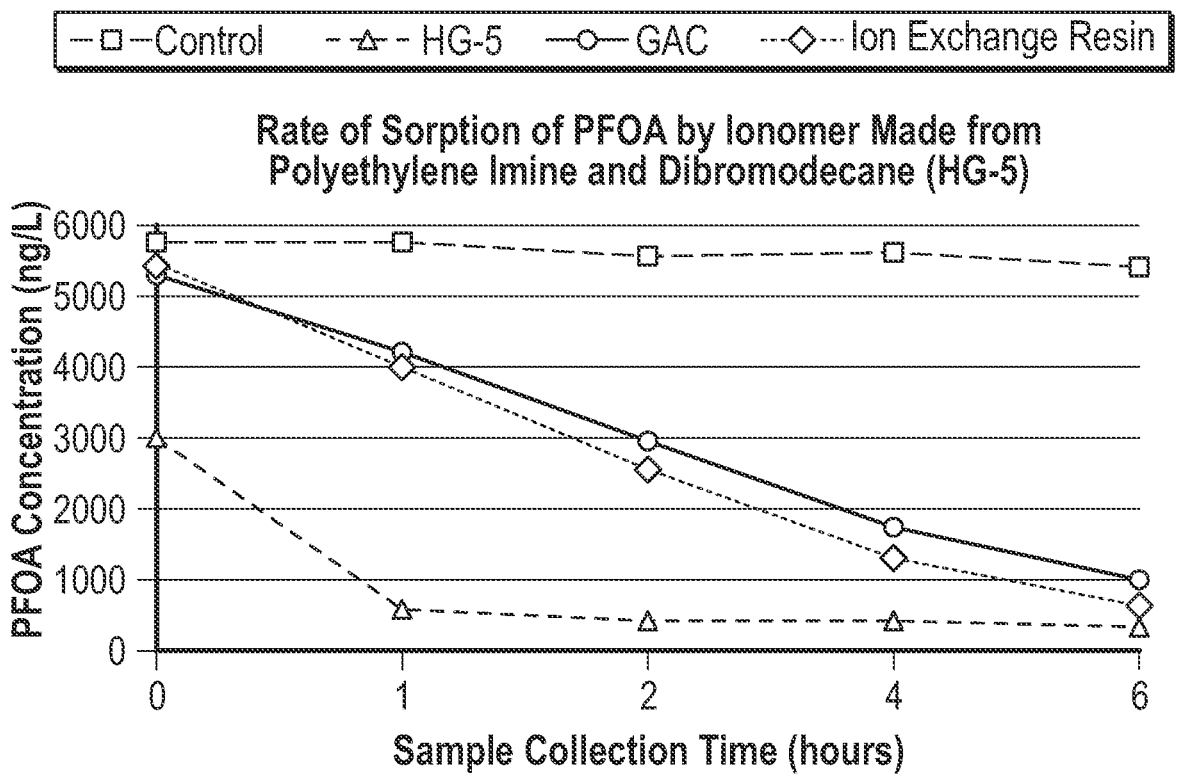
FIG. 18 shows the results from an experiment (Example 13) to demonstrate the performance of a poly(alkylamine) ammonium salt (designated HG-5) in removing perfluorooctanoic acid (PFOA) from water against GAC and IAX after timed exposure.

FIG. 18 shows the amount of PFOA remaining in solution after timed exposure to HG-5, GAC, and IAX. HG-5 removed PFOA at a faster rate than GAC and IAX even when used in lower quantities (1 mg of HG-5 vs. 8 mg of GAC and IAX). At time 0 (which is approximately 5 minutes), HG-5 removed nearly half of the PFOA in solution. Within 1 hour, HG-5 was able to remove substantially all of the PFOA in solution.

Example 14—Experiment to Test the Performance of HG-1 and HG-5 to Absorb PFOA at High Concentrations and Compare the Result Against the Performance of GAC and IAX to Absorb PFOA at High Concentrations 8 mg of HG-1, HG-5, GAC, and anion exchange resin were all weighed into separate 20 mL polypropylene bottles. 16 mL HPLC-grade water was added to each bottle, followed by 4 mL of 1 µg/mL PFOA solution. Controls consisted of 16 mL water and 4 mL PFOA solution. All bottles were shaken by hand for 10 seconds and their contents allowed to settle for 1 minute. Samples of 25 µL were taken from each bottle and combined in microcentrifuge tubes with 975 µL water, centrifuged, and aliquots were taken for HPLC-MS/MS analysis. Bottles were placed on a wrist-action shaker and sampled by the above-mentioned methods at the following time intervals: 1, 2, 4, 6, and 24 hours. All samples were analyzed by HPLC-MS/MS.

Figure 19:
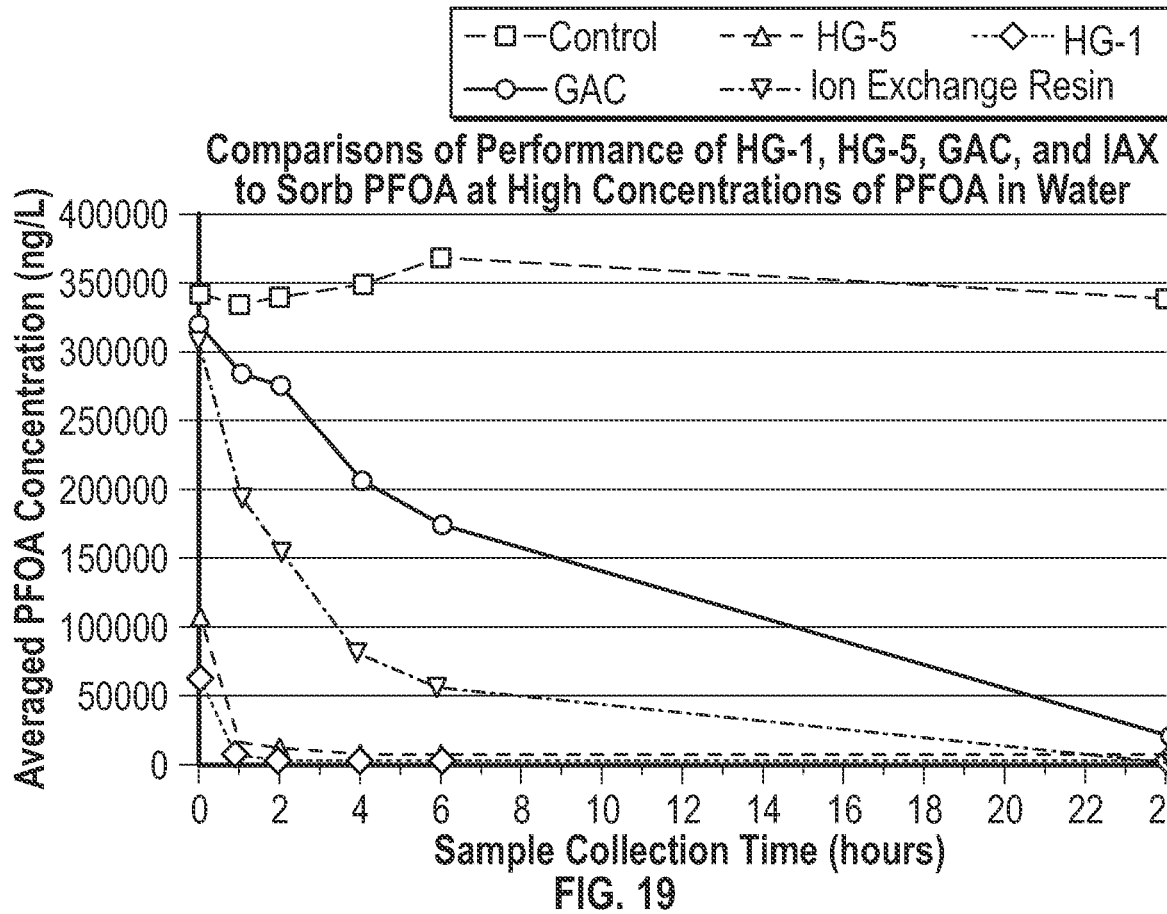
FIG. 19 shows the results from an experiment (Example 14) to demonstrate the performance of HG-1 and HG-5 to absorb PFOA at high concentrations against the performance of GAC and IAX.

FIG. 19 shows the sorption capabilities of HG1, HG-5, GAC, and anion exchange resin at high PFOA concentrations. Sorption kinetics were observed to be much faster for HG-1 and HG-5 than for GAC and the IAX resin, substantially removing all PFOA by 1 hour. At 1 hour, GAC had only removed about 20% of the PFOA from solution, and the IAX resin had only removed about 50% of the PFOA from solution. As for early PFOA removal kinetics (within 1-2 hours), the sorbents can be ranked in the following order (most removal-least removal): HG-1, HG-5, IAX, and GAC.

Example 15—Poly(Alkylamine) Ammonium Salt Samples HG-1 and HG-5 Sorption Efficacy at Low PFOA Concentrations Poly(alkylamine) ammonium salt samples HG-1 and HG-5 capabilities were compared for removal of PFOA from aqueous slurries at low concentrations. The samples were tested by the following method. Sorbent slurries were prepared to achieve a more accurate 1 mg mass of sorbent. 200 mg quantities of each sorbent were added to polypropylene beakers and mixed with 200 mL HPLC-grade water. Sorbent slurries were mixed for 30 minutes prior to pipetting 1 mL of slurry solution into 125-mL polypropylene bottles which contained 99 mL water and 0.1 mL of 1 ug/mL PFOA solution. A control bottle was also prepared which was 100 mL water and 0.1 mL of 1 ug/mL PFOA solution. Samples were taken from each bottle and pipetted into microcentrifuge tubes, centrifuged, and aliquots were taken for HPLC-MS/MS analysis. The bottles were placed on a wrist-action shaker and sampled by the above-described methods at the following time intervals: 1, 2, 4, 6, and 24 hours. All samples were analyzed by HPLC-MS/MS.

Figure 20:
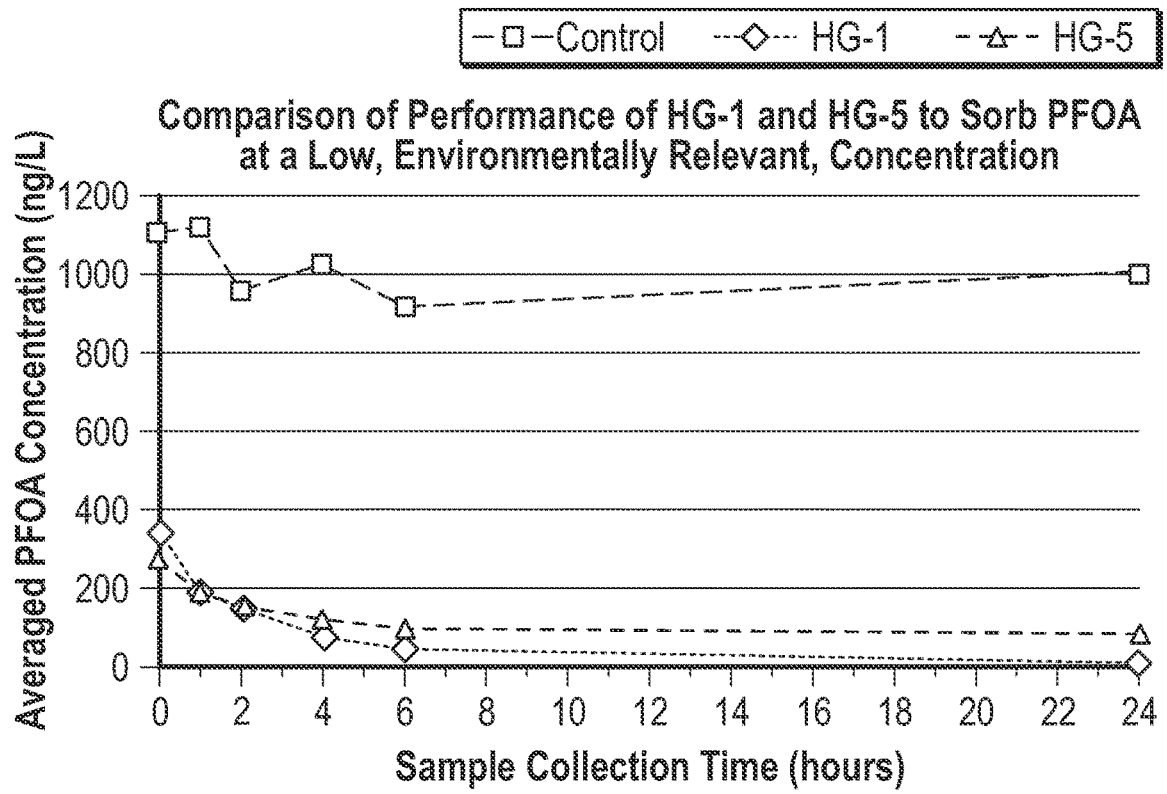
FIG. 20 shows the results from an experiment (Example 15) to demonstrate the performance of HG-1 and HG-5 to absorb PFOA from aqueous slurries at low concentrations.

FIG. 20 shows PFOA sorption capabilities of poly(alkylamine) ammonium salt samples HG-1 and HG-5 at low PFOA concentrations. Both HG-1 and HG-5 samples performed very similarly. At time 0, which was approximately 5 minutes from exposure to sorbent, both sorbents had removed nearly 70% of the PFOA from the solution. After 24 hours of exposure, HG-1 is shown to have removed nearly all of the PFOA from the solution, and HG-5 is shown to have removed about 90% of the PFOA from solution. It can be said that both samples HG-1 and HG-5 removed substantially all of the PFOA from the solution, but the HG-1 sample is shown to have performed slightly better.

Example 16—Experiments to Demonstrate Use of Cross-Linked Poly(Alkylamine) Ammonium Salts Under Dynamic Flow Conditions by Passing Water Through a Dry-Packed Column Column studies were performed for 10 mg quantities of sorbent samples HG-1 and HG-5 dry packed into 1 mL columns to demonstrate PFAS removal from PFAS-contaminated tap water. A bottom filter frit was placed in the 1 mL columns. 10 mg of each sorbent was weighed into separate columns. Top filter frits were added a distance above the sorbent to account for sorbent expansion. The columns were placed on a vacuum pump apparatus, and 1 mL of HPLC-grade water was added to each column until the sorbent samples were saturated. Enough vacuum pressure was applied to pull water through the columns. The top filter frits were pressed into each column until the frits touched the surface of the sorbent samples. Following that, 100 mL of tap water was passed through each column. Filtrate was collected below each column. Solid phase extraction was performed on the filtrate as well as the tap water as a control by the EPA 533 methods and then analyzed by HPLC-MS/MS.

Figure 21:
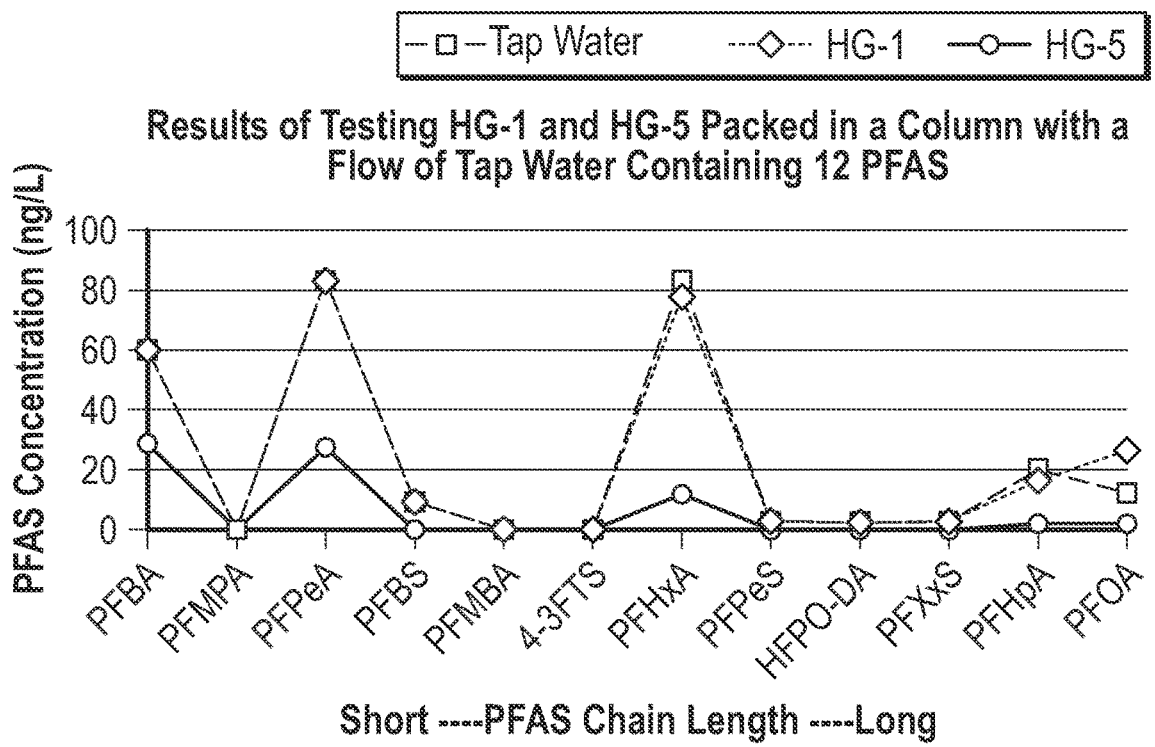
FIG. 21 shows the results from an experiment (Example 16) to demonstrate the performance of HG-1 and HG-5 packed in a column with a flow of tap water containing 12 PFAS.

Results for one dry-packed column study are shown in FIG. 21. Sample HG-1 is shown to have performed well in removing PFAS, while sample HG-5 did not remove any PFAS from the tap water. The difference for HG-5 is attributed to channeling through the sorbent which is believed to have been caused by random air pockets coupled with a high flow rate. Care was taken to avoid compacting the column once saturated with water, but it is likely that the filter frits needed to be pressed more firmly, removing any pockets of air that may have formed.

Example 17—Column Flow Test for PFOA Sorption Using a 1:9 Ratio of Sorbent to Granulated Activated Carbon (GAC)

A mass ratio of 1:9, sorbent to GAC, was performed for a column study of PFOA sorption. 30 mg of each sorbent was combined with 270 mg GAC and mixed by glass mortar and pestle until relatively homogenous. 100 mg of each sorbent/GAC mixture was added to columns with bottom column frits already inserted. 100 mg of only GAC was also weighed into the columns. 20 mL of PFOA solutions were made by adding 50 μL of 1 μg/mL PFOA solution to 9.95 mL of water. Controls were made with 10 mL of water. Columns were then placed on a vacuum apparatus and 10 mL HPLC-grade water was passed through each column without top frits inserted. Sorbents were allowed to become completely saturated with the HPLC-grade water, and then top filter frits were added to the columns and pressed firmly against the sorbent/GAC mixtures so as to press out air pockets without compacting the material. Reservoirs were added to each column to hold approximately 4 mL of solution. All columns were assembled in duplicate so that PFOA solutions and a water blank were passed through each sorbent mixture or GAC type. Filtrate was collected below the columns in a 15 mL centrifuge tube. Each solution was pulled through vacuum very slowly, allowing a slow single drop to pass through at a time. Collected filtrate was vortexed and a 1 mL sample of each was taken and analyzed by LC-MS/MS.

Figure 22A:
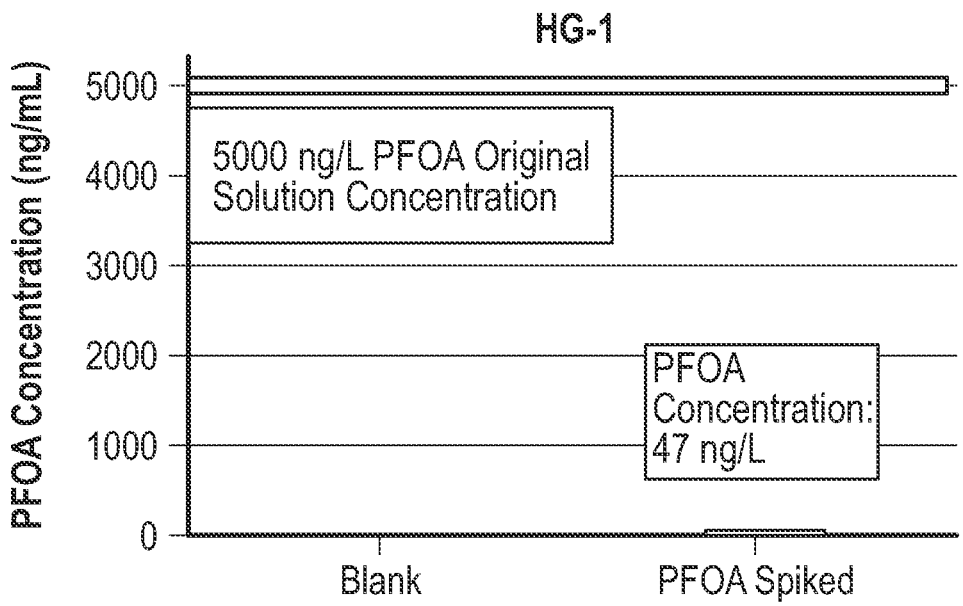
FIGS. 22A, 22B, and 22C show the results from a test (Example 17) using three columns to show PFOA absorption using a 1:9 ratio of sorbent HG-1 or HG-5 to GAC.
Figure 22B:
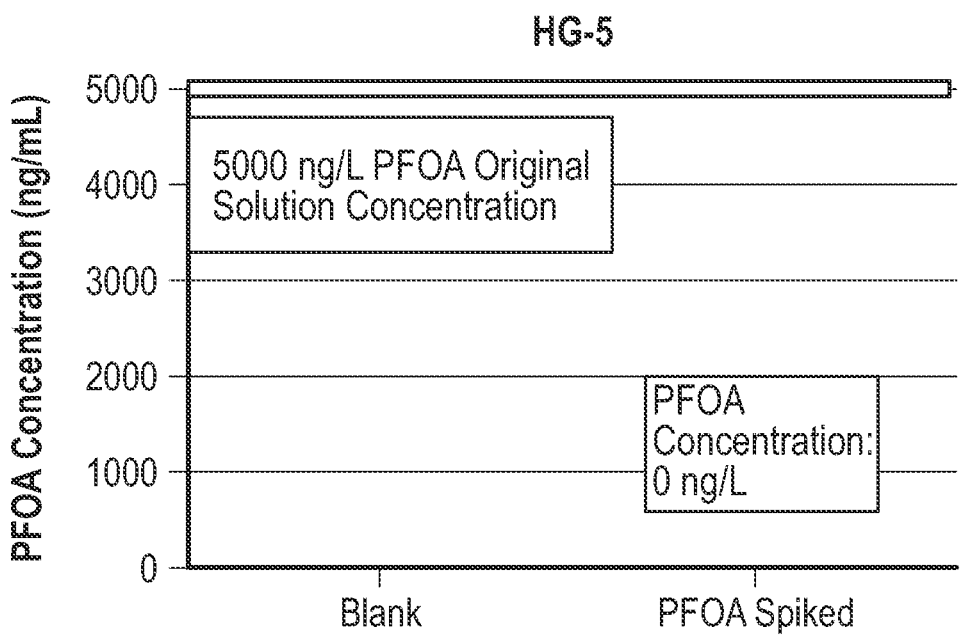
Figure 22C:
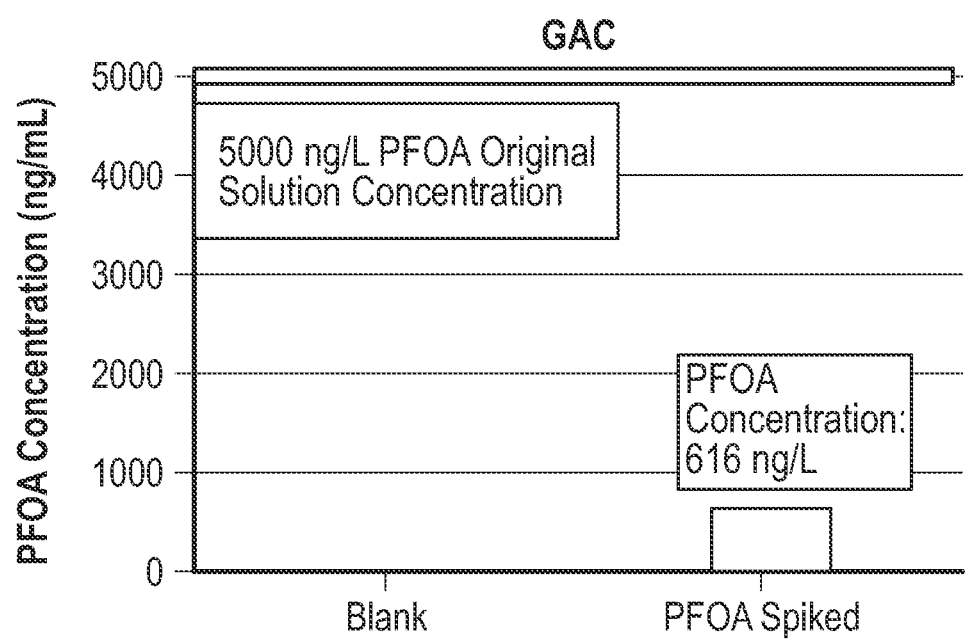

The results from Example 17 are shown in FIG. 22 which is split into three different graphs to illustrate results of both the blanks passed through the column and PFOA spiked water. If the columns absorbed PFOA compounds successfully, then the concentration of the filtered solution should be near zero, as the blank solutions illustrate. These results show that a 1:9 ratio of sorbent/GAC works well in a column for PFOA removal from solutions. GAC alone was tested, but did not remove all PFOA compounds from the solution. Poly(alkylamine) ammonium salt sample HG-5 showed no detectable PFOA compounds in solution after passing through the column. Poly(alkylamine) ammonium salt sample HG-1 performed well in removing substantially all PFOA compounds from the solution. This example demonstrates that a 1:9 ratio of poly(alkylamine) ammonium salt sorbent to granulated activated carbon can prevent water flow channeling and allow for a more tightly packed column without affecting the overall flow rate of the column.

Example 18—Experiments to Identify Conditions Under which PFAS Compounds Absorbed by the Poly(Alkylamine) Ammonium Salts According to the Inventive Concept(s) Described and Claimed Herein can be Recovered from the Salts Absorption and desorption (i.e., removal & recovery) of PFAS compounds was tested for poly(alkylamine) ammonium salt samples HG-1 and HG-5 using different alkaline solutions. In triplicate, 8 mg of each sorbent HG-1 and HG-5 was weighed into 20 mL polypropylene bottles. 4 mL of 1 μg/mL PFOA compounds and 16 mL HPLC-grade water was added to each reactor, i.e., each bottle. The bottles were shaken by hand for 15 seconds and then allowed to settle for 1 minute. Samples from each bottle were taken, centrifuged at 10,000 rpm for 2 minutes, and aliquots saved for analysis. The bottles were then placed on a shaker table for 2 hours. At 2 hours, samples were taken from each bottle and processed as above. Bottles were allowed to settle for 5 minutes and then solution was carefully removed by disposable pipette without removing sorbent from the bottom of the bottles. 20 mL of three different desorption solutions were then added to one of each sorbent type bottle. The desorption solutions were as follows: (1) 2% ammonium hydroxide in methanol, (2) 2% ammonium hydroxide in water, and (3) 2% sodium hydroxide in water. Preferred pH range for all desorption solutions based on observed results is from about 8 to 14. The bottles were shaken on a shaker table for 1 hour and were then allowed to settle. 15 mL of solution was removed from the two bottles that contained ammonium hydroxide in methanol, and the solutions were evaporated to dryness by a gentle stream of nitrogen. Dry samples were reconstituted to 1 mL and processed by HPLC-MS/MS. The bottles containing water solutions were processed by solid phase extraction, following the EPA 533 method for concentrating PFAS in solution. Care was taken not to pass sorbent material into the solid phase extraction by careful pipetting. Some solution remained at the bottom of the bottle so as to avoid processing the sorbent material. Samples were then processed by HPLC-MS/MS. This same process was also completed for both 2% ammonium and sodium carbonate aqueous solutions and the resulting data has been added to the hydroxide desorption figure (FIG. 24).

Figure 23:
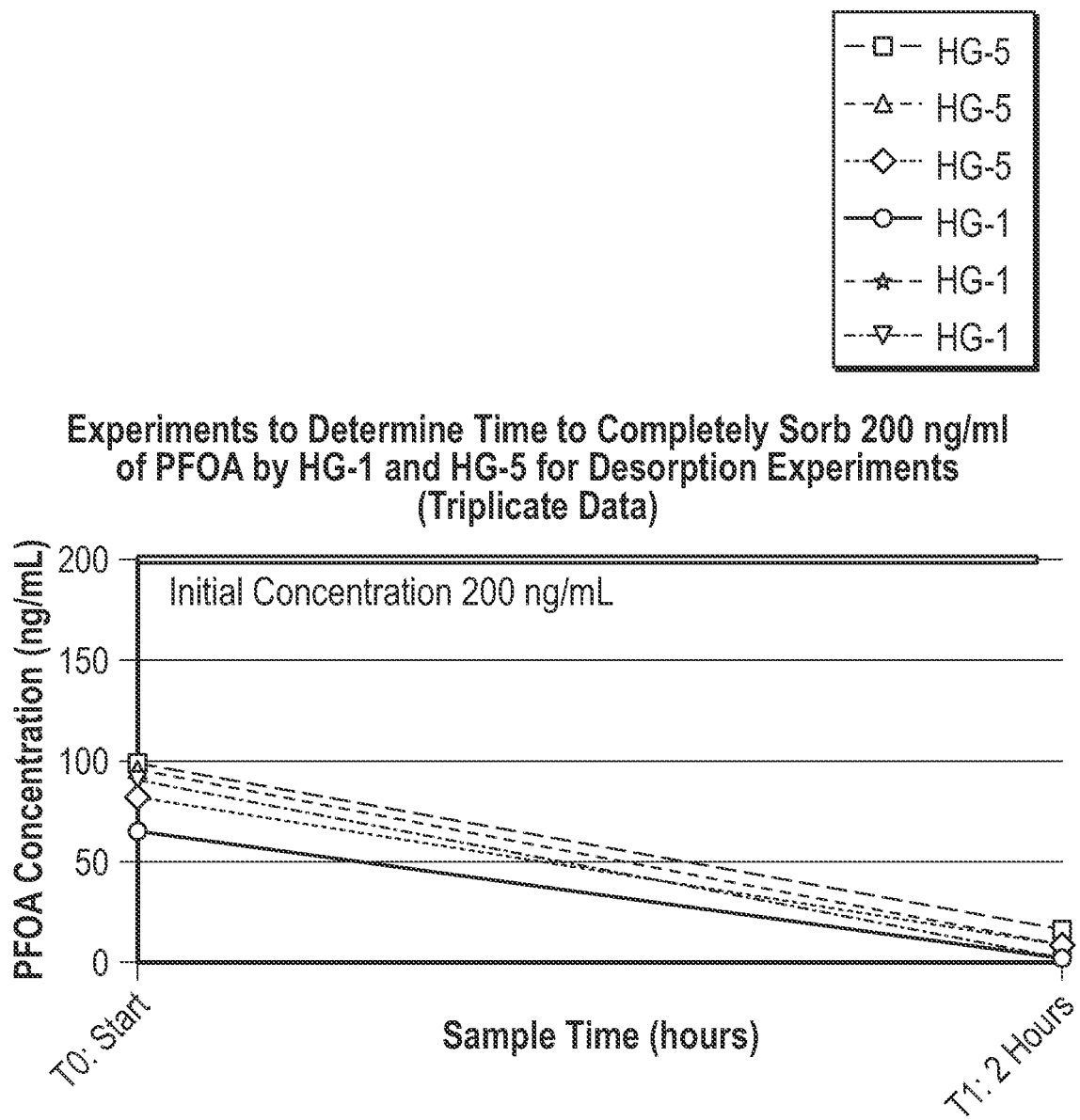
FIG. 23 shows the results from an experiment (Example 18) to identify conditions under which PFAS compounds absorbed by poly(alkylamine) ammonium salts can be recovered from the salts.

FIG. 23. Displays substantially complete sorption of PFOA from solution by poly(alkylamine) ammonium salt sorbent samples HG-1 and HG-5 within two hours, meaning that the sorbents samples were loaded with PFOA before the desorption step described in Example 18 was conducted.

FIG. 24 presents the results from the desorption step in Example 18. For both samples HG-1 and HG-5, ammonium hydroxide and methanol were able to desorb about 50% of adsorbed PFOA. Ammonium hydroxide and water was able to desorb about 90% for HG-5, but very little for HG-1. Also noteworthy, sodium hydroxide and water had nearly identical results compared to ammonium hydroxide and water. These results confirm desorption of PFOA without the presence of organic solvents. For sample HG-1 the results indicate that desorption is more effective using a methanol and basic solution as opposed to a water solution. The results also indicate that sample HG-5 can desorb PFOA more effectively using a water and base solution.

Figure 25:
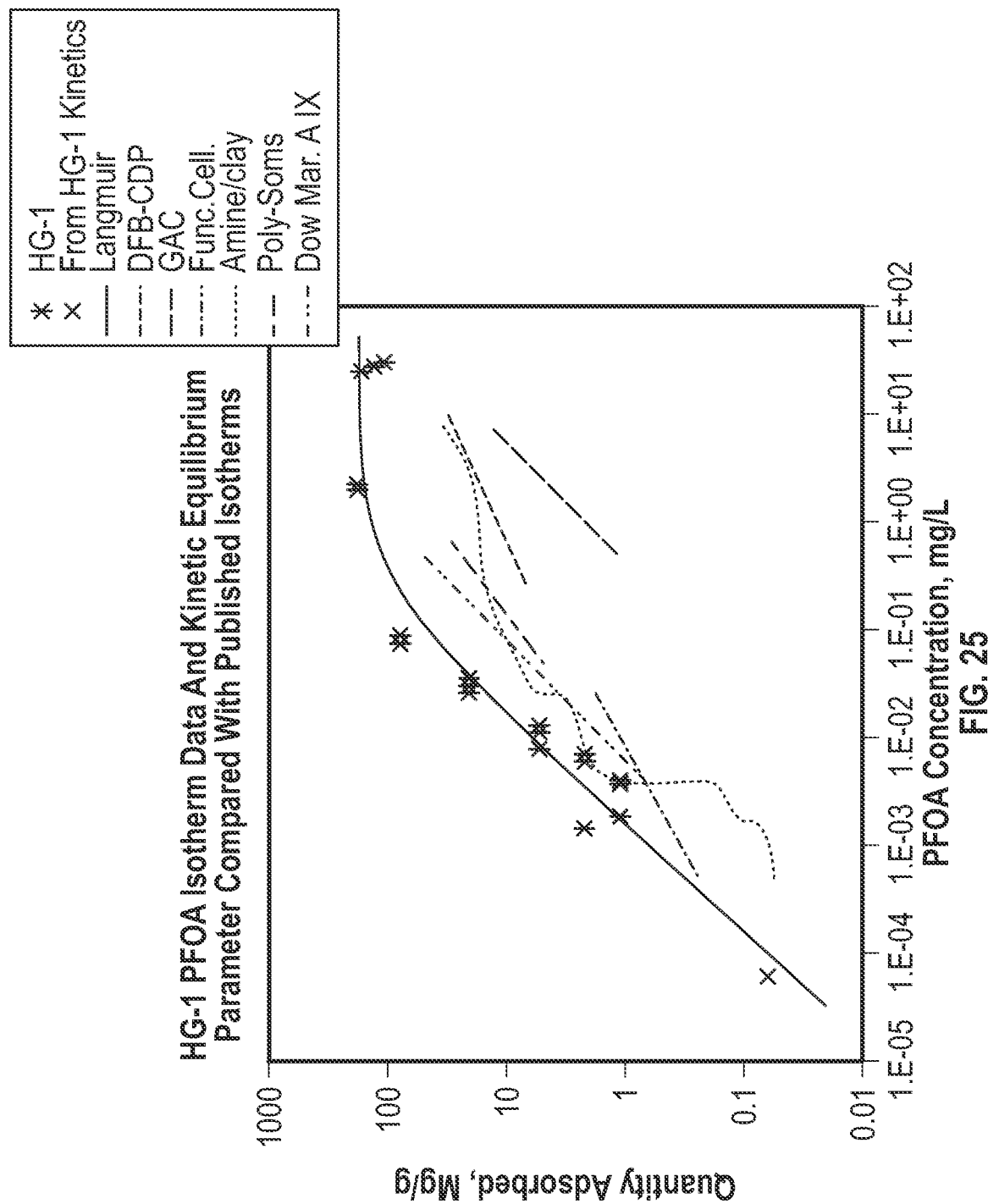
FIG. 25 shows the results from Example 19 to construct an isotherm for adsorption of PFOA by sample HG-1 and comparison with published isotherms for other materials.

Example 19—Experiments to Construct an Isotherm for Adsorption of PFOA by Sample HG-1 and Comparison with Published Isotherms for Other Materials Experiments were conducted with poly(alkylamine) ammonium salt sample HG-1 to determine equilibrium PFOA adsorption capacity over a broad range of concentrations. Seven 20 ml bottles were prepared containing PFOA solutions ranging in concentrations from 0.1 to 40 mg/L and 2 mg each of HG-1 (100 mg/L). Seven similar bottles were prepared as controls containing the same range of PFOA concentrations but no sorbent. Time 0 samples were taken from the control bottles for conformation that the correct amount of PFOA concentration was present in the bottles. All bottles were shaken for 24 hours at room temperature. 1 mL sample aliquots of the supernatant liquid were taken from each vessel at the end of 24 hours and centrifuged before sub-sampling for analysis by HPLC-MS/MS. There was negligible change in the PFOA concentrations in the control bottles. From the decreases in PFOA concentration in the bottles containing HG-1, the quantities of PFOA adsorbed per gram of HG-1 were calculated. Quantity adsorbed is plotted against final concentration in the HG-1 sample bottles in FIG. 25. A Langmuir isotherm of the form $q=Q*K_L*C/(1+K_L*C)$, where q is the quantity adsorbed and C is the final concentration in the bottle, was found for sample HG-1 by using non-linear regression to find the values 175 mg/g for Q and 3.51 L/mg for $K_L$ that best fit the data. The isotherm is plotted in FIG. 25. The lowest concentration point in the figure, marked "from HG-1 kinetics" was calculated from a separate experiment, similar to Example 15, not included in the regression analysis. The isotherm found from the rest of the HG-1 data passes close to the value from the kinetic experiment. Literature data, identified below, were located from similar isotherm studies on various commercial and developmental PFAS sorbent materials (identified in the figure caption) and the published isotherms are also shown plotted in FIG. 25. All the published isotherms fall below the isotherm found for sample HG-1. [Published isotherms—DFB-CDP decafluorobiphenyl-cyclodextrin polymer (Xiao, et al., 2017), GAC granular activated carbon (Zhang, et al., 2016), functionalized cellulose (Ateia, et al., 2018), surfactant amine-modified clay (Yan, Wang, & Liu, 2021), poly-SOMS: polymer-infused swellable organically modified silica (Stebel, et al., 2019), Dow Marathon anion exchange resin (Chularueangaksom, Tanaka, Fujii, & Kunacheva, 2014)]

Figure 26:
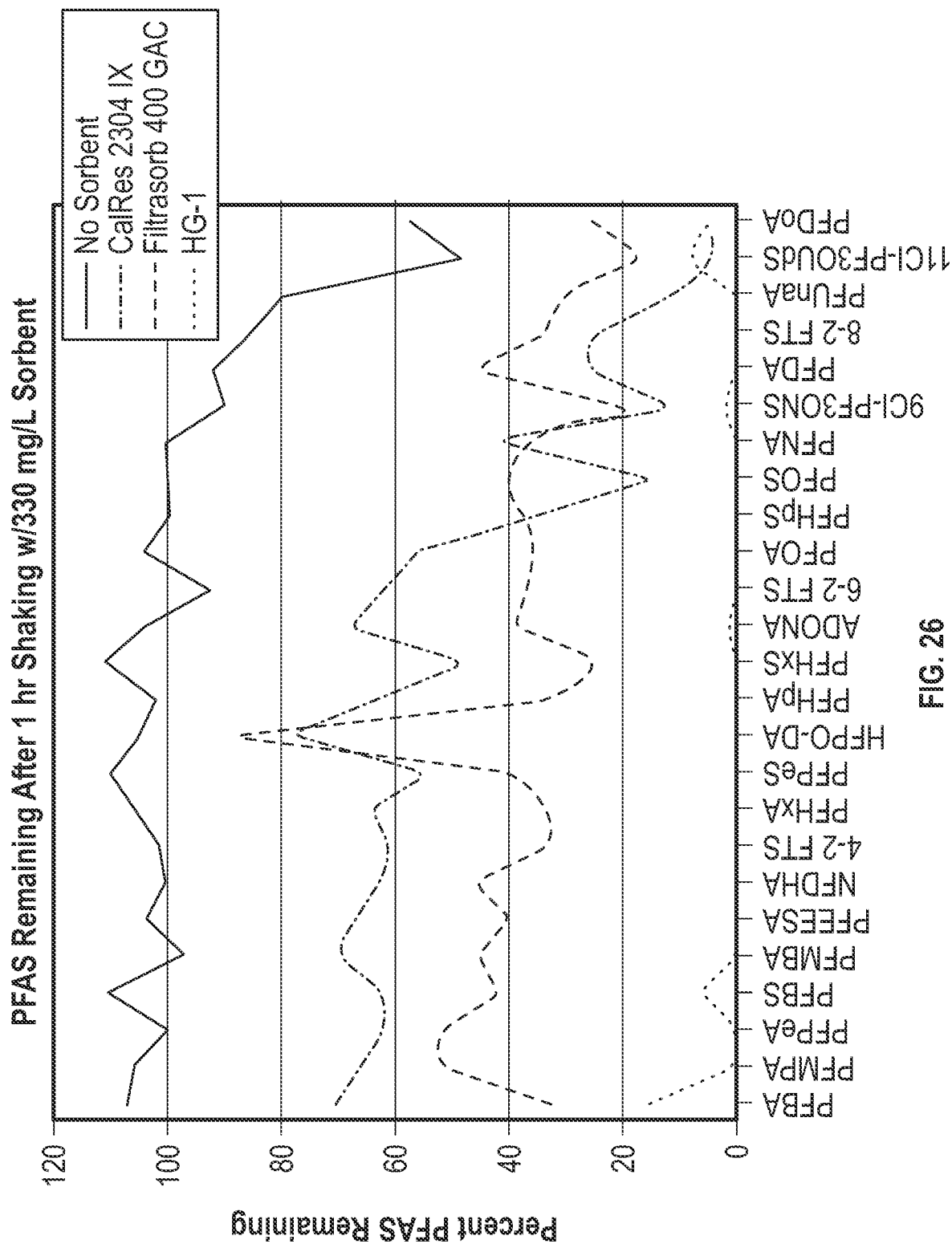
FIG. 26 shows the results from Example 20 which compares PFAS absorption as a function of PFAS chain length between sample ionomer HG-1 and two conventional adsorbents.

Example 20—Comparison of PFAS Absorption as a Function of PFAS Chain Length Between Ionomer Sample HG-1 and Two Conventional Adsorbents Tests were conducted with (i) ionomer prepared as for Example 1 (HG-1), (ii) Calgon Filtrasorb© 400 granular activated carbon, and (iii) CalRes 2304CD SAX anion exchange resin. Ten milligrams of each sorbent were weighed into a 50-mL polypropylene centrifuge tube. Thirty mL of ultrapure water was added to each tube, followed by 300 µL of a mixture of 25 PFAS standards. The PFAS concentration of each component was 100 ng/L with a total PFAS concentration of approximately 2500 ng/L. Two control samples were prepared; one contained water only, the other contained water and 100 ng/L of each PFAS analyte with no sorbent present. All tubes were placed on a wrist-action shaker for one hour. After one hour, 0.5 mL of each sample was combined with 0.5 mL of methanol for HPLC-MS/MS quantification using a reference calibration standard containing 50 ng/L of each analyte. FIG. 26 presents the results. PFAS removal by sample HG-1 was nearly complete for the full range of PFAS and greatly exceeded removal by the comparison materials.

Figure 27:
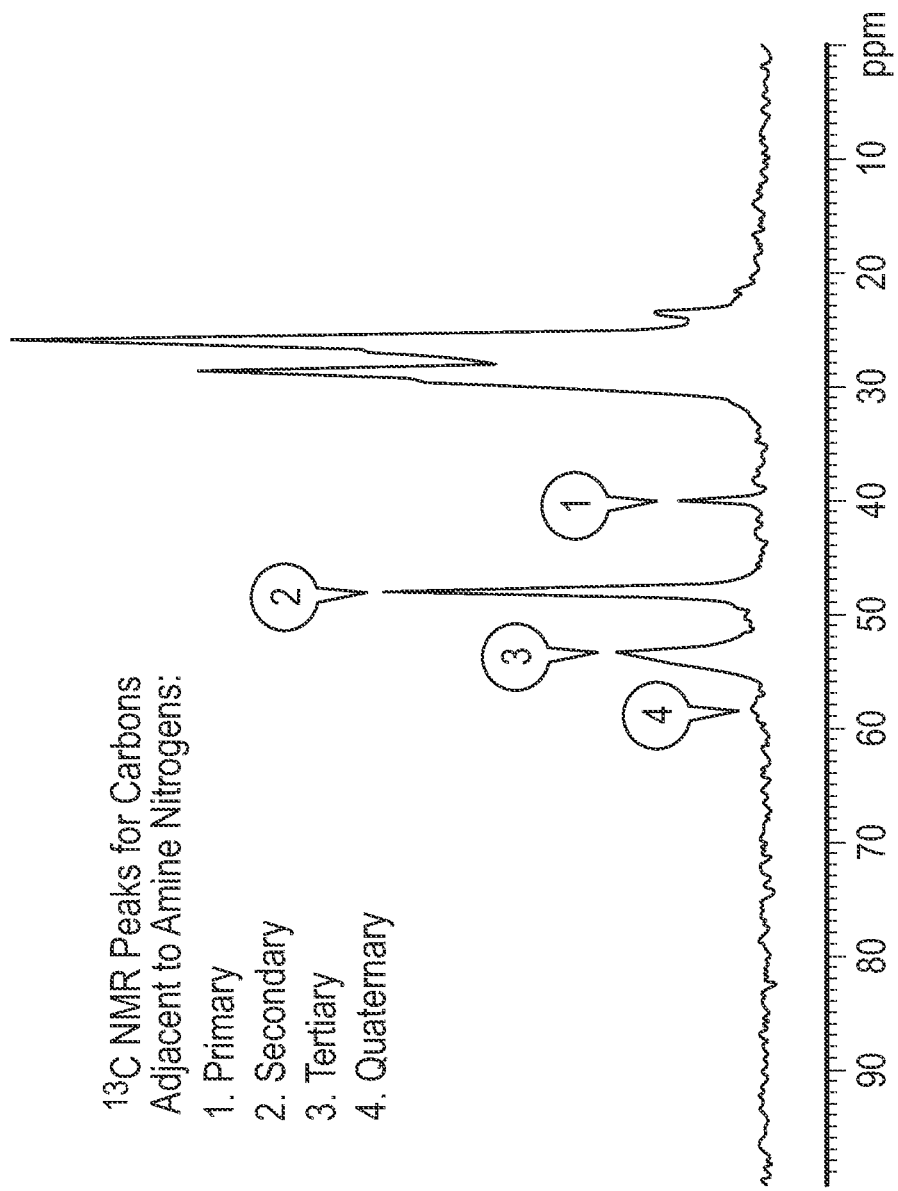
FIG. 27 shows the spectrum from which the relative abundance of amine types in sample HG-1 was calculated according to Example 21.

Example 21—Experiment to Determine Relative Abundance of Amines in HG-1 Sample Material Carbon 13 NMR was run on a sample of ionomer prepared as described in Example 1 (HG-1), and the relative abundance of amine types were calculated from the integrated peaks of the spectrum shown in FIG. 27, with the following results.

| ppm  | amine type | abundance |
|------|------------|-----------|
| 59.0 | quaternary | 1.4%      |
| 54.5 | tertiary   | 27.0%     |
| 48.4 | secondary  | 53.2%     |
| 40.5 | primary    | 18.3%     |

A high abundance of secondary amine nitrogen atoms (e.g., 53.2%) is considered favorable for PFAS adsorption, although all four types are thought to be active. The abundances of tertiary and primary amines provide information on the extent of cross-linking and branching. The graphic illustration which follows represents a section of a copolymer network that is consistent with the NMR data. Counterions, such as chloride, would be distributed throughout the network, balancing positive charges of the amines. Although the actual network is three dimensional and somewhat random in shape, the diagram shows an approximately correct extent of branching and cross-linking. A limited extent of cross-linking allows flexibility to swell and admit PFAS compounds.

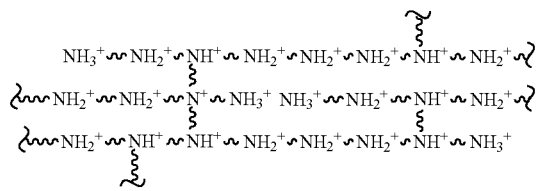

The cross-linked ammonium salts described herein can be used in passive sampling devices, such as, for example, cartridges and discs, for monitoring PFAS contaminants in water. They can also be used in polar organic chemical integrative samplers (POCIS). Such samplers are a passive sampling device which allows for the in situ collection of a time-integrated average of hydrophilic organic contaminants. POCIS provides a means for estimating the toxicological significance of waterborne contaminants. The POCIS sampler mimics the respiratory exposure of organisms living in the aquatic environment and can provide an understanding of bioavailable contaminants present in the system. POCIS can be deployed in a wide range of aquatic environments and is commonly used to assist in environmental monitoring studies.

Most aquatic monitoring programs rely on collecting individual samples, often called "grab samples", at a specific time. The grab sampling method has many disadvantages, some of which can be resolved by passive sampling techniques. When contaminants are present in trace amounts, grab sampling may require the collection of large volumes of water. Also, lab analysis of the grab sample can only provide a snapshot of contaminant levels at the time of sample collection. This approach, therefore, has drawbacks when monitoring pollutants in environments where contamination varies over time and episodic contamination events occur.

The cross-linked ammonium salts described herein, due to their capability to absorb PFAS rapidly, can provide an effective way to monitor PFAS contamination. Devices, such as cartridges, which contain the cross-linked ammonium salts, can be placed in monitoring wells, and after a predetermined length of time, the devices can be removed and subject to conditions to desorb the PFAS compounds according to the inventive concept(s) described herein. The freed PFAS compounds can then be analyzed and quantified. Such systems which contain cross-linked ammonium salts enable study of the speed with which a plume of PFAS pollution moves in ground water and pore water pollution and the direction in which it moves. This type of information reduces uncertainty and provides essential information before, during, and after soil remediation and contamination management processes. Passive samplers which contain cross linked ammonium salts can be deployed in a wide range of aquatic environments, including, for example, stagnant pools, wells, rivers, springs, estuarine systems, and wastewater streams.

The cross-linked ammonium salts according to the inventive concept(s) described herein can also be used to rapidly absorb PFAS in spills, such as, for example, in spent aqueous liquid that results from use of PFAS of the type contained in fire-fighting foam, or in industrial and municipal waste water streams and systems which have PFAS contaminants.

Contaminated surface or well water often contains suspended solids which must be flocculated into larger particles before they can be removed by settling or filtration. Commonly, flocculating agents are added which can be inorganic compounds, or synthetic or biologically-based polymers known to promote the flocculation process. By using the techniques described herein to control molecular weight and extent of cross-linking, the cross-linked ammonium salts specified for these inventive concepts can be rendered capable of being fed as a solution or suspension at the same stage of a water treatment process as the flocculating agent. Subsequent settling or filtration to remove the flocculated solids would then also remove PFAS without the need for additional treatment steps. If required, the PFAS could then be removed at high concentration from the separated solids by leaching with alkaline solutions, such as those described above, for eventual processing by other techniques to destroy the PFAS.

As those skilled in the art will appreciate, numerous modifications and variations of the described and claimed inventive concept(s) are possible in light of these teachings, and all such are contemplated hereby. The present invention contemplates and claims those inventions that may result from the combination of features described herein and those of the cited prior art references which complement the features of the present invention.

What is claimed is:

1. A method for absorbing at least one PFAS molecule from an aqueous medium wherein said at least one PFAS molecule comprises a water soluble fluorinated amphiphilic structure with a carbon chain length that ranges from 4 to at least 14 carbon atoms which comprises:

contacting said PFAS molecule with at least one self-supported crosslinked polymeric ammonium salt, wherein said salt is a water-insoluble, solid polyelectrolyte having at least one polymer chain, wherein said polyelectrolyte comprises a copolymer network wherein ammonium nitrogen atoms are separated by group Y or group Z ordered along (i) polymer chains as N—Z—[N—Y—N—Z]$_n$—N and along (ii) cross-linking polymer chains as Y, or Y—N—Z—N—[Y—N—Z—N]$_n$—Y, wherein said cross linking polymer chains connect between one ammonium nitrogen atom in one polymer chain, and another ammonium nitrogen atom in another polymer chain and (iii) along pendant polymer chains as Y—N—Z—[N—Y—N—Z]$_n$—N wherein said pendant chains originate at ammonium nitrogen atoms in other polymer chains, wherein n has a value from 0 to any higher integer, wherein group Y is an n-alkylene group or an alkyl substituted n-alkylene group, wherein said n-alkylene group or said alkyl substituted n-alkylene group has from 2 to at least 20 carbon atoms; and group Z is a hydrocarbylene group containing from 2 to 50 carbon atoms, said hydrocarbylene group optionally substituted with one or more hydroxyl, ether, amino, thioether, keto, ester, silyl group or heterocyclic rings; and at least 25% of the ammonium nitrogen atoms are secondary ammonium nitrogen atoms, with the result that said PFAS molecules are absorbed into said at least one crosslinked polymeric ammonium salt.

2. The method of claim 1 wherein said hydrocarbylene groups contain from 1 to 30 carbon atoms, and said PFAS molecule is contacted in the optional presence of a flocculent or a coagulant.

3. The method of claim 1 wherein the at least one crosslinked polymeric ammonium salt has a swell factor of at least about 2 in water.

4. The method of claim 3 wherein the at least one crosslinked polymeric ammonium salt is combined with an amount of granulated activated carbon.

5. The method of claim 3 wherein the at least one crosslinked polymeric ammonium salt is a poly(alkylamine) ammonium salt.

6. The method of claim 5 wherein the poly(alkylamine) ammonium salt is combined with an amount of granulated activated carbon.

7. The method of claim 5 wherein the poly(alkylamine) ammonium salt is prepared from hexamethylene diamine and 1,10-dibromodecane using DMF/methanol as solvent.

8. The method of claim 5 wherein the poly(alkylamine) ammonium salt is prepared from polyethylene imine and 1,10-dibromodecane using DMF/methanol as solvent.

9. The method of claim 1 which includes the additional steps of (i) desorbing said at least one PFAS molecule from said at least one crosslinked polymeric ammonium salt, by contacting the at least one crosslinked polymeric ammonium salt, which contains PFAS molecules with an aqueous alkaline solution having a pH in the range of from about 8 to 14 with the result that the at least one PFAS molecule is released from the at least one crosslinked polymeric ammonium salt, and (ii) recovering the at least one PFAS molecule and the at least one crosslinked polymeric ammonium salt.

10. The method of claim 9, wherein the crosslinked polymeric ammonium salt is a poly(alkylamine) ammonium salt and the PFAS molecule is perfluoro-octanoic acid (PFOA).

11. The method of claim 10 wherein the crosslinked polymeric ammonium salt is a poly(alkylamine) ammonium salt prepared from hexamethylene diamine and 1,10-dibromodecane using DMF/methanol as solvent.

12. The method of claim 10 wherein the crosslinked polymeric ammonium salt is a poly(alkylamine) ammonium salt prepared from polyethylene imine and 1,10-dibromodecane using DMF/methanol as solvent.

13. The method of claim 1 which includes the additional steps of (i) desorbing said at least one PFAS molecule from said at least one crosslinked polymeric ammonium salt by contacting the at least one crosslinked polymeric ammonium salt which contains said at least one PFAS molecule with an ammonium hydroxide/methanol solution with the result that the at least one PFAS molecule is released from the at least one crosslinked polymeric ammonium salt, and (ii) recovering the at least one PFAS molecule and the at least one crosslinked polymeric ammonium salt.

14. The method of claim 13, wherein the crosslinked polymeric ammonium salt is a poly(alkylamine) ammonium salt and the PFAS molecule is perfluoro-octanoic acid (PFOA).

15. The method of claim 1 which includes the additional steps of (i) desorbing said at least one PFAS molecule from said at least one crosslinked polymeric ammonium salt by contacting a crosslinked polymeric ammonium salt which contains a PFAS molecule with a sodium hydroxide/water solution with the result that the PFAS molecule is released from the crosslinked polymeric ammonium salt, and (ii) recovering the PFAS molecule and the crosslinked polymeric ammonium salt.

16. The method of claim 15, wherein the crosslinked polymeric ammonium salt is a poly(alkylamine) ammonium salt and the PFAS molecule is perfluoro-octanoic acid (PFOA).

17. The method of claim 1 wherein said at least one PFAS molecule comprises a telomer alcohol of the type used in aqueous fire-fighting foam compositions.

18. The method of claim 1 wherein the at least one crosslinked polymeric ammonium salt is deployed in a polar organic chemical integrative sampler (POCIS).

19. The method of claim 1 wherein the aqueous medium comprises at least one of stagnant pools, wells, rivers, springs, estuarine systems, and industrial and municipal wastewater streams.

20. The method of claim 1 wherein said at least one PFAS molecule is contacted with a mixture of said crosslinked polymeric ammonium salts in the optional presence of at least one flocculent or at least one coagulant.

* * * * *

UNITED STATES PATENT AND TRADEMARK OFFICE
CERTIFICATE OF CORRECTION

| | | |
|---|---|---|
| PATENT NO. | : 12,434,222 B2 | Page 1 of 1 |
| APPLICATION NO. | : 18/165091 | |
| DATED | : October 7, 2025 | |
| INVENTOR(S) | : Seetha M. Coleman-Kammula et al. | |

It is certified that error appears in the above-identified patent and that said Letters Patent is hereby corrected as shown below:

In the Specification

Column 9, Line 10: Delete "bis" and replace with -- b is --

Column 9, Line 29: Delete "R" and replace with -- It --

Column 13, Line 36: Delete "Ce)" and replace with -- $C_8$ --

Column 19, Line 23: Delete "perfluoro-actanoic" and replace with -- perfluoro-octanoic --

Signed and Sealed this
Eleventh Day of November, 2025

John A. Squires
*Director of the United States Patent and Trademark Office*